(12) United States Patent
Sharma et al.

(10) Patent No.: US 7,782,873 B2
(45) Date of Patent: Aug. 24, 2010

(54) OMNI-PROTOCOL ENGINE FOR RECONFIGURABLE BIT-STREAM PROCESSING IN HIGH-SPEED NETWORKS

(75) Inventors: Viswa Sharma, San Ramon, CA (US); Roger Holschbach, Blaine, MN (US); Bart Stuck, Westport, CT (US); William Chu, Cambridge, MA (US)

(73) Assignee: SLT Logic, LLC, Boston, MA (US)

( * ) Notice: Subject to any disclaimer, the term of this patent is extended or adjusted under 35 U.S.C. 154(b) by 281 days.

(21) Appl. No.: 11/466,367

(22) Filed: Aug. 22, 2006

(65) Prior Publication Data

US 2007/0067481 A1    Mar. 22, 2007

Related U.S. Application Data

(60) Provisional application No. 60/710,561, filed on Aug. 23, 2005, provisional application No. 60/761,129, filed on Jan. 23, 2006, provisional application No. 60/820,243, filed on Jul. 25, 2006, provisional application No. 60/822,181, filed on Aug. 11, 2006.

(51) Int. Cl.
    *H04L 12/56* (2006.01)
(52) U.S. Cl. ............. 370/395.5; 370/463; 370/230
(58) Field of Classification Search ............. 370/395.5, 370/463, 469, 230, 246, 252, 352–354, 295.5, 370/410, 413–419
See application file for complete search history.

(56) References Cited

U.S. PATENT DOCUMENTS

| | | | |
|---|---|---|---|
| 4,307,447 A | | 12/1981 | Provanzano et al. |
| 5,101,403 A | * | 3/1992 | Balzano ............ 370/242 |
| 5,317,726 A | * | 5/1994 | Horst ............ 714/12 |
| 6,199,137 B1 | * | 3/2001 | Aguilar et al. ........ 710/305 |
| 6,282,632 B1 | * | 8/2001 | Higaki et al. ........ 712/42 |
| 6,671,869 B2 | | 12/2003 | Davidson et al. |
| 6,721,872 B1 | | 4/2004 | Dunlop et al. |
| 6,765,916 B1 | * | 7/2004 | Duvvuru et al. ........ 370/395.5 |
| 6,775,284 B1 | * | 8/2004 | Calvignac et al. ....... 370/392 |
| 6,934,280 B1 | | 8/2005 | Ho et al. |
| 6,934,780 B2 | | 8/2005 | Modelski et al. |

(Continued)

OTHER PUBLICATIONS

Silvano Gai, "Toward a unified architecture for LAN/WAN/WLAN/SAN switches and routers," HPSR 2003, 32 pages.

(Continued)

*Primary Examiner*—Kwang B Yao
*Assistant Examiner*—Andrew Lai
(74) *Attorney, Agent, or Firm*—Patterson Thuente Christensen Pedersen, LLP

(57) ABSTRACT

A reconfigurable, protocol indifferent bit stream-processing engine, and related systems and data communication methodologies, are adapted to achieve the goal of providing inter-fabric interoperability among high-speed networks operating a speeds of at least 10 gigabits per second. The bit-stream processing engine operates as an omni-protocol, multi-stage processor that can be configured with appropriate switches and related network elements to create a seamless network fabric that permits interoperability not only among existing communication protocols, but also with the ability to accommodate future communication protocols. The method and systems of the present invention are applicable to networks that include storage networks, communication networks and processor networks.

3 Claims, 36 Drawing Sheets

U.S. PATENT DOCUMENTS

| | | | |
|---|---|---|---|
| 6,934,817 | B2 | 8/2005 | Ellison et al. |
| 6,934,943 | B2 | 8/2005 | Hundt et al. |
| 2002/0161907 | A1* | 10/2002 | Moon .......................... 709/230 |
| 2003/0110464 | A1* | 6/2003 | Davidson et al. .............. 716/17 |
| 2004/0071129 | A1* | 4/2004 | Doerr et al. ................. 370/352 |

OTHER PUBLICATIONS

Bove et al., "Media Processing with Field-Programmable Gate Arrays on a Microprocessor's Local Bus," Massachusetts Institute of Technology Media Library, 7 pages.

Dr. Lawrence G. Roberts, "The Next Generation of IP—Flow Routing," SSGRR 2003S International Conference, L'Aquila Italy, Jul. 29, 2003, 13 pages.

Hazarika and Brunner, "Why Priority/Class Based PAUSE is Required?," P802.3ar Congestion Management, 10 pages.

Tomas Henriksson, "Intra-Packet Data-Flow Protocol Processor," Institute of Technology, Linkoping 2003, 134 pages.

International Application No. PCT/US06/32747; International Preliminary Report on Patentability; dated Feb. 19, 2009; 7 pages.

European Search Report; European Application No. EP 06 80 2072; dated Dec. 4, 2008.

* cited by examiner

Packet State Machine

|  | Byte 0 | Byte 1 | Byte 2 | Byte 3 |
|---|---|---|---|---|
| Word 0 | FB | AA | AA | AA |
| 1 | AA | AA | AA | AB |
| 2 | Dest. MAC (Bytes 5-2) | | | |
| 3 | Dest. MAC (Bytes 1-0) | | Src. MAC (Bytes 5-4) | |
| 4 | Src. MAC (Bytes 3-0) | | | |
|  | E-Type/Length (2) | | Data* | |
| ... | Data* | | | |
|  | CRC/FCS* | | | |
| N-1 | FD* | XGMII padding as needed | | |
| N | XGMII Idle | | | |

* Random byte alignment

FB – XGMII Start of Preamble
AB – XGMII Start of Frame

Ethernet Frame
Min = 64 bytes
Max = 1518 bytes
(May end on odd bytes)

FD – XGMII Terminate
XGMII requires at least one idle frame (verify)

FIG. 8A

| 0 | | | 63 |
|---|---|---|---|
| Dest. MAC (5-0) | | | Src. MAC (5-4) |
| Src. MAC (3-0) | E-Type/Length (2) | | Data |
| Data bytes total <= 1500 bytes | | | |
| CRC/FCS | | Additional pad as needed | |

FIG. 8B

| State | Frame Data | Next state | Control and Frame Data | Comments |
|---|---|---|---|---|
| 0 | X,No SOF,X | 0 | 0 | Wait for start of frame |
| 0 | X,SOF,X | 1 | Capture MAC | Setup MAC capture logic |
| 1 | X, VlanB, X | 2 | Vlan | Capture 1$^{st}$ VLAN |
| 1 | X, No VlanB,X | 5 | | No VLAN |
| 2 | X, VlanA, VlanB, X | 3 | | Capture 2$^{nd}$ and 3$^{rd}$ VLAN |
| 2 | X, VlanA, No VlanB, X | 5 | Sel B | Capute 2$^{nd}$ VLAN |
| 2 | X, No VlanA,X | 5 | Sel A | |
| 3 | X,VlanA,X | 4 | Update Error | Error more Than 3 VLAN |
| 4 | X | 4 | | Loop on Error until EOF RST |
| 5 | X | 6 | | Setup compare |
| ... | ... | ... | ... | ... |

FIG. 13

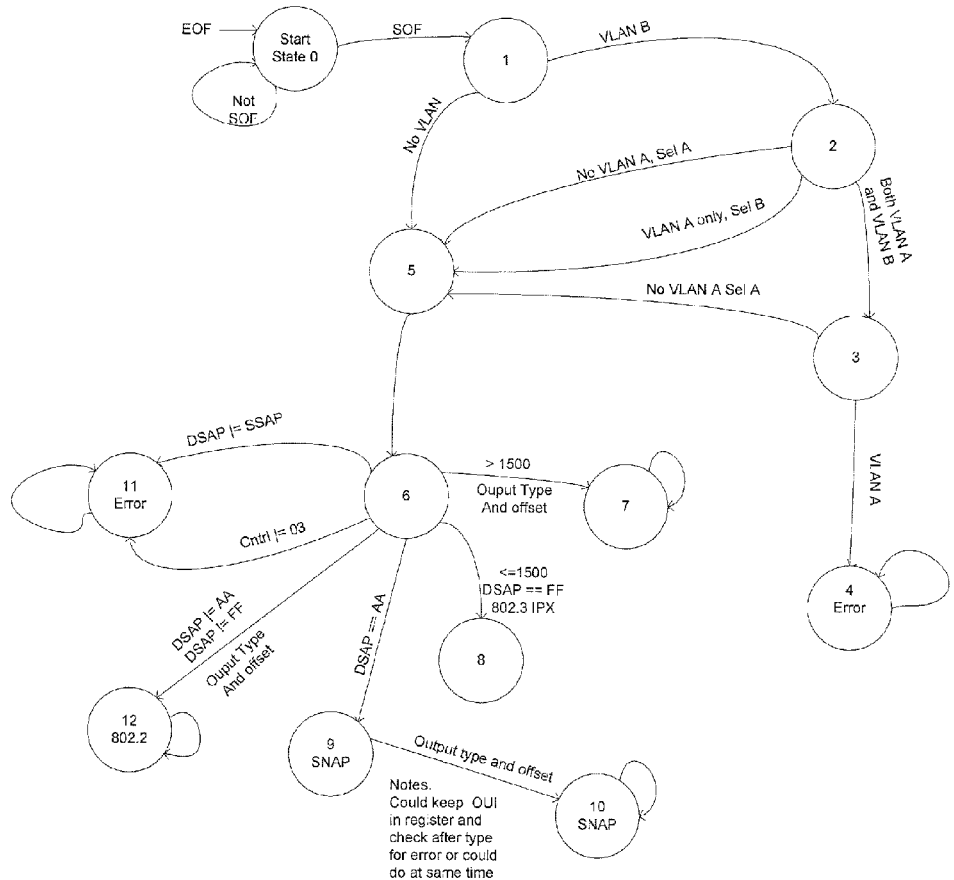

FIG. 14

| Memory Address 0 - FFFF Hex | Data bit corresponding to Ethernet Protocol TYPE decode | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | Type decode bits for Port-B | | | | | | | | | | | | | | | | Type decode bits for Port-A | | | | | | | | | | | | | | | |
| Type | 17 | 16 | 15 | 14 | 13 | 12 | 11 | 10 | 9 | 8 | 7 | 5 | 4 | 3 | 2 | 1 | 0 | 17 | | 15 | 14 | 13 | 12 | 11 | 10 | 9 | 8 | 7 | 5 | 4 | 3 | 2 | 1 | 0 |
| 0x0000 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0x0001 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0x0002 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0x0003 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| .... | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0x809B AppleTalk Phase 1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 1 |
| ... | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0x8137 IPX (Novell Netware) | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 1 | 0 |
| ..... | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0x8847 MPLS Unicast | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 1 | 0 | 0 |
| 0x8848 MPLS Multicast | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 1 | 0 | 0 | 0 |
| .... | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| .... | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0xFFFD | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0xFFFE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0xFFFF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 15

Input to state machine options

Output from state machine option

Mask and Compare Circuit

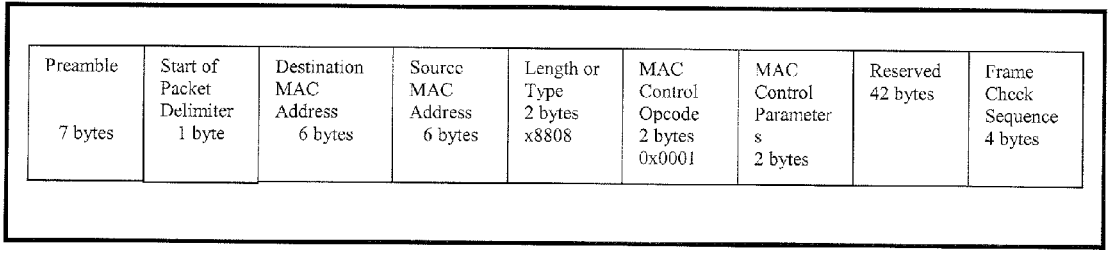

FIG. 23

Table of Port State Events

| Event | Description |
|---|---|
| TX_ENABLE | The SFPs need to be enabled. This event indicates the SFP has been successfully enabled |
| TX_DISABLE | The SFP has been disabled. |
| MOD_DETECT | After the SFP has been enabled, we can determine if an SFP actually exists. |
| LOSS_OF_MOD | SFP has been removed. |
| TX_FAULT | Indicates a laser fault of some kind. |
| SIGNAL_DETECT | Signals that the received optical signal power is above the worst case receiver sensitivity. |
| LOS | Loss of signal, indicates the optical signal power has dropped below the worst case receiver sensitivity. |
| SIGNAL_SYNC | Signal is synchronized |
| LOSS_OF_SYNC | Word synchronization has been lost. |
| AUTO_NEG_DONE | Ethernet Auto-negotiation complete. |
| MAC_ACQUIRED | MAC address of connected node has been learned. |
|  |  |

FIG. 24

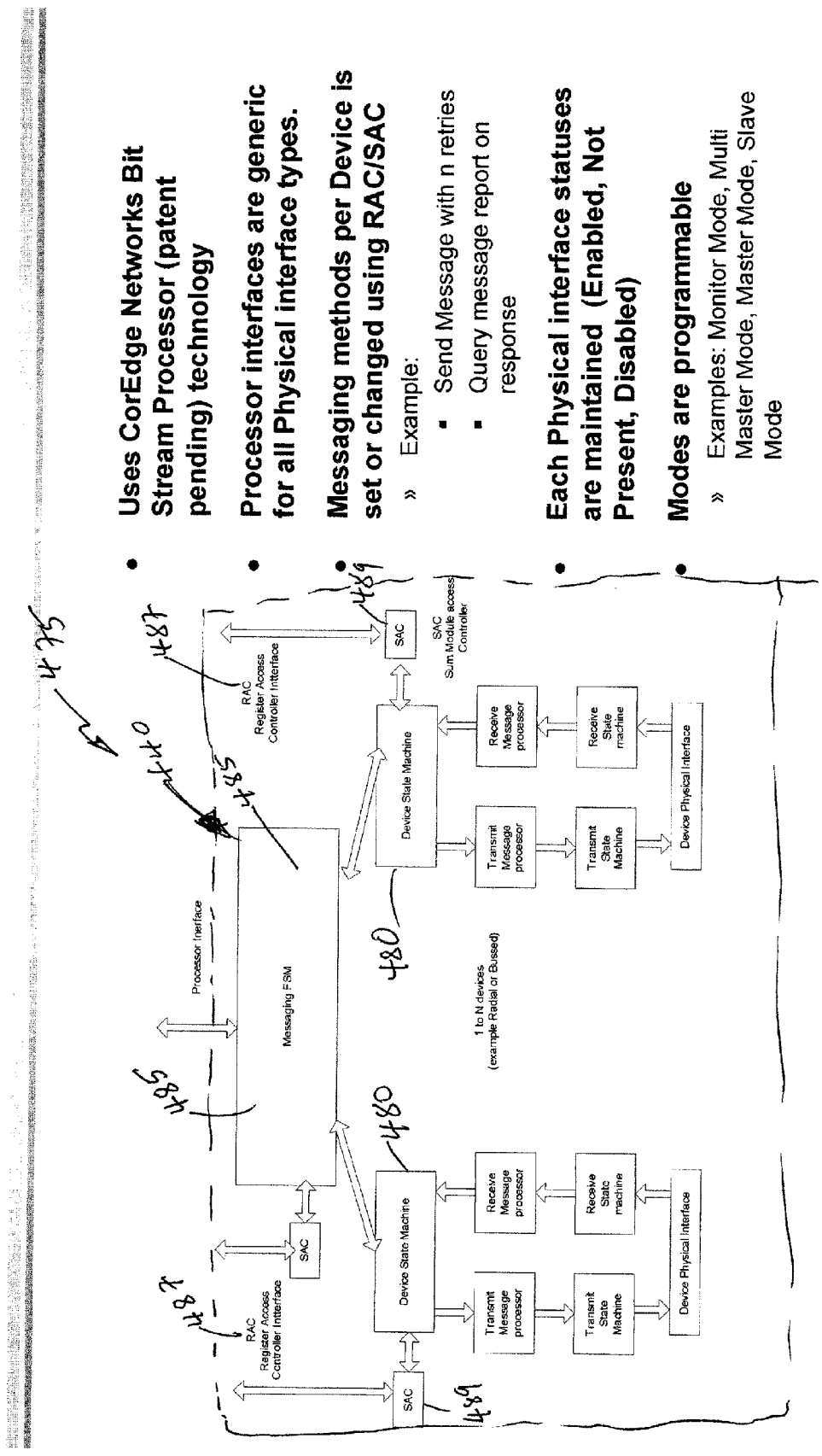

OMNI-PROTOCOL ENGINE FOR RECONFIGURABLE BIT-STREAM PROCESSING IN HIGH-SPEED NETWORKS

RELATED APPLICATIONS

The present invention claims the benefit of priority to U.S. Provisional Patent Application No. 60/710,561, entitled "Omni-Protocol Engine for Reconfigurable Bit-Stream Processing in High-Speed Networks," filed Aug. 23, 2005, U.S. Provisional Patent Application No. 60/761,129, entitled "Shelf Management Controller with Hardware/Software Implemented Dual Redundant Configuration", filed Jan. 23, 2006, U.S. Provisional Patent Application No. 60/820,243, entitled "Telecommunication and Computing Platforms Having Advanced TCA Based Packaging and Ethernet Switched Fabric", filed Jul. 25, 2006, and U.S. Provisional Patent Application No. 60/822,181, entitled "Enhanced Ethernet Protocol for Shortened Data Frames Within a Constrained Neighborhood based on Unique ID", filed Aug. 11, 2006, the disclosures of each of which are hereby incorporated by reference.

FIELD OF THE INVENTION

The present invention relates generally to the field of data communications in a network. More specifically, the present invention relates to a reconfigurable, protocol indifferent bit stream-processing engine, and to related systems and data communication methodologies, adapted for high-speed networks operating at speeds of at least 10 gigabits per second.

BACKGROUND OF THE INVENTION

Traditionally, networks have been divided into different kinds of infrastructures or fabrics based on the purpose of a given network. As a result, different kinds of networks have been developed for storage networks, communication networks and processor networks, each having different protocols and different network requirements and each designed to meet the particular requirements for data communication within that fabric.

In the case of processor networks, network performance is a critical element in high-performance cluster computing (HPCC) applications. Typically, HPCC applications run for extended periods of time and require sustained I/O of large datasets over the network between processors as well as between the client and server. Predictably, the infrastructure must be capable of supporting multi-gigabit bandwidth, low-latency, very high availability services that are an absolute requirement for high-end cluster inter-process communications. Conventionally, HPCC networks utilize Switched Gigabit Ethernet. Proprietary protocols such as, for example, Myrinet, InfiniBand and Quadrics also find widespread use in connecting processing clusters in a HPCC environment.

The need for massive amounts of data necessitates that the networked processors in a HPCC application, for example, be efficiently connected to a storage network fabric. Conventionally, HPCC supporting infrastructure includes either a storage attached network (SAN) switching fabric such as a Fibre Channel switch, or a Gigabit Ethernet-based network attached storage (NAS) environment. Fibre Channel is the dominant protocol and transport for a SAN fabric because of multi-gigabit speeds and transport protocols that are optimized for moving massive amounts of block storage data between clients and storage devices.

Internet Protocol (IP) communication networks tend to dominate the fabric for communications among different HPCC applications, as well as general communications among clients and servers over the broader Internet fabric. Some storage networks have adopted piggyback protocols suitable for moving block storage data over IP storage networks such as Internet SCSI (iSCSI), Internet Fibre Channel Protocol (iFCP), and Fibre Channel over IP (FCIP). These piggyback protocols, however, do not necessarily permit direct inter-operability between communication networks and storage networks.

The goal of providing inter-fabric interoperability across these different kinds of network fabrics is a well-known goal. While it may be straightforward to achieve this goal in the context of low speed networks where all of the processing required in the network could be accomplished with standard programmable processors, such a solution is simply not viable at the high communication speeds required for high speed networks operating at 10 gigabits per second and higher. For the most part, specialized adapters have been used to make the transition between a specific protocol at the fabric and a common protocol at a central switch node. Although this approach may be transparent to the end-user, it is readily apparent to one skilled in the art that such a patchwork of adapters presents an exponentially exploding problem in terms of the ever-growing number of protocols. The ability to provide a high speed network switch that would be capable of handling multiple protocols is a solution that at least some network equipment makers do not believe is possible. Silvano Gai, "Toward a unified architecture for LAN/WAN/WLAN/SAN switches and routers," pp. 23, HSPR 2003, Cisco Systems, Inc. (noting the non-availability of a 10 Gb/s cheap LAN switch). Accordingly, there is a need to find a solution to the goal of providing inter-fabric interoperability among networks that is both efficient and scalable for high-speed networks.

SUMMARY OF THE INVENTION

The present invention provides a reconfigurable, protocol indifferent bit stream-processing engine, and related systems and data communication methodologies, that are adapted to achieve the goal of providing inter-fabric interoperability among high-speed networks operating a speeds of at least 10 gigabits per second. The bit-stream processing engine operates as an omni-protocol, multi-stage processor that can be configured with appropriate switches and related network elements to create a seamless network fabric that permits interoperability not only among existing communication protocols, but also with the ability to accommodate future communication protocols. The method and systems of the present invention are applicable to networks that include storage networks, communication networks and processor networks.

In one embodiment of the invention, the omni-protocol processing engine operates as a data flow processing engine that includes both an ingress portion and an egress portion, each portion having at least one bit-stream stage processor. Preferably, each stage processor is optimized for a particular stage in the data flow. Conceptually, the data flow processing engine works much like a production assembly line in that as the flow of data moves through the processing engine different processing is accomplished as different stages of the assembly line, and all of the processing is timed to the flow of the data. The flow of data through the processing engine is established at a rate that will permit continued operation of the processing engine at the line speed of the network(s) to which the processing engine is connected. The data flow model utilized in this embodiment avoids the need for deep and extensive buffer management in order to keep track of data as would be necessary in a conventional protocol processor. Furthermore, the engines in any stage are inherently cascadable to support scalability.

In one embodiment of the omni-protocol processing engine (OPE), the multiple stages include at least an ingress stage bit-stream processor, a secondary stage state machine, a traffic processor, a scheduler and an egress stage bit-stream processor. The ingress stage bit-stream processor interfaces with the physical layer of the data flow and establishes frames and/or flows for the bit stream in accordance with a protocol determined for the bit-stream. The secondary stage state machine parses the frames/flows in accordance with the determined protocol, preferably using a programmable Very Long Instruction Word (VLIW) flow classifier that pipelines key generation. Frame/flow processing is handled by the traffic processor. The scheduler manages the data flow output from the traffic processor and the egress stage bit-stream processor interfaces with the physical layer of the data flow out of the omni-protocol processing engine. All of the stages are dynamically reconfigurable and reprogrammable to permit the OPE to be protocol indifferent.

In one embodiment, the secondary stage state machine and the traffic processor utilize a novel key lookup arrangement to improve the efficiency of the OPE. The traffic processor can be implemented as a multiple-segmented data flow processor arrangement where the segments in the traffic processor are implemented dependent upon the given protocol of a frame/flow. In the embodiment of the traffic processor, the multiple-segmented data flow processors implement an arbitrated and/or time-division multiplexing (TDM) approach to accessing a common shared buffer memory where the data flow of the frame/flow resides. In this way, there is no need for each data flow processor to copy some or all of the data in the frame/flow into an internal buffer in that processor in order to process that data. Moreover, the data flow processors can be cascaded and extensible as a result of both stage abstraction and clock abstraction.

In one embodiment of the present invention, an omni-protocol, 48 port, non-blocking QoS Gigabit switch is implemented using four OPEs interfaced with a SPI 4.2 digital switch. In this embodiment, each OPE is interfaced with 12 SerDes ports for external connections and three SPI 4.2 ports for connection to the SPI 4.2 digital switch. When located in the middle of a storage network, HPCC processor cluster, intranet and internet communication network, such a switch effectively operates as a convergent fabric permitting protocol indifferent network connections among any or all of these networks. This embodiment of the present invention provides an intelligent switching solution in that the switch is programmable-on-the-fly as well as reconfigurable allowing each packet to be handled differently (i.e. 100% packet-by-packet routing at 10 Gbps for example) according to instantaneously reprogrammed/reconfigured OPE's that comprise the "port processors," or the digital switch that forms the central switching fabric. In this manner, the switching solution provides a high performance (>=10 Gbps per port bandwidth), low latency (<5 usec switching), protocol independent, policy based switching that is scalable to thousands of nodes, interoperable with existing network infrastructure, provides telco reliability/fault tolerance (i.e Five 9's availability) in a cost effective manner.

In another embodiment of the present invention, the OPEs and associated network elements are all dynamically reconfigurable and programmable using a register access control (RAC) and submodule access control (SAC) arrangement with a GUI management system that manages code generation, flow control, performance profiling and statistics, as well as diagnostics and maintenance for the system. In a specific embodiment, the GUI management system includes a module for virtually designing the system, a simulation engine capable of simulating the expected performance of the as-designed architecture in a "What You See Is What You Get" fashion and a Code Generator (Micro Code Manager) that generates the microcode for reprogramming the OPE and any other reprogrammable/reconfigurable network device if required.

BRIEF DESCRIPTION OF THE DRAWINGS

FIGS. 8A and 8B are schematic illustrations of the General Ethernet Format from XGMII and the General Format of Ethernet.

FIG. 13 is an exemplary extensible table for the programmable state machine of FIG. 12.

FIG. 14 is an exemplary state diagram for the programmable state machine of FIG. 12.

FIG. 15 is an exemplary table for the programmable decode table.

FIG. 23 is a schematic of a standard Ethernet Frame encountered at the ingress device according to the present invention.

FIGS. 24 and 25 are schematic representations illustrating the operational configuration of the Programmable State Machine and the Mask and Compare circuit according to one embodiment of the present invention.

FIG. 37A illustrates an exemplary I2C hardware finite state machine (HFSM) implementation according to the present invention.

DETAILED DESCRIPTION OF THE PREFERRED EMBODIMENTS

Figure 1A:
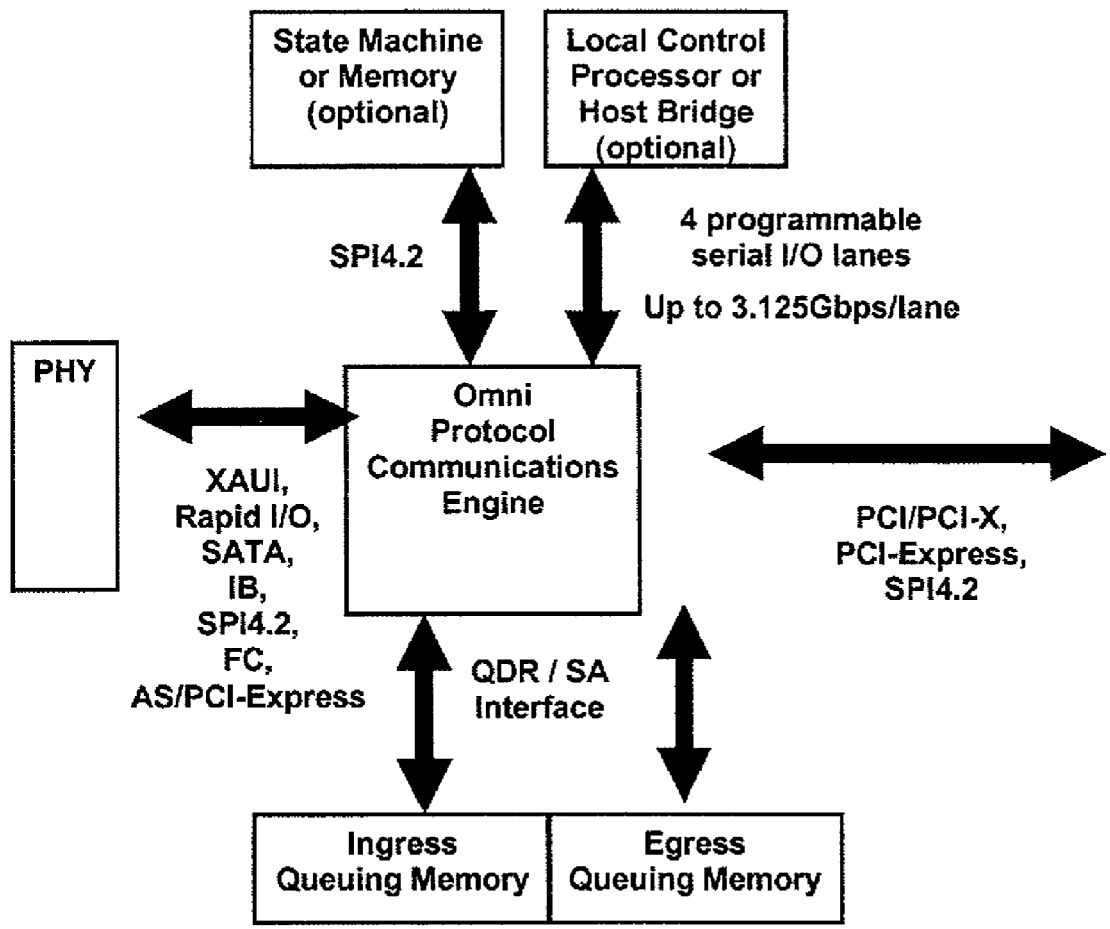
FIGS. 1A and 1B are functional block diagrams of an Omni-Protocol Engine in accordance with one embodiment of the present invention.

The present invention comprises novel apparatus, system and method for wire-speed data path processing in a network. FIG. 1A illustrates a block diagram of one embodiment of a system in accordance with the present invention. Central to this embodiment is an Omni-Protocol Engine (OPE). The OPE is a protocol indifferent bit-stream, multi-stage processor which includes the dual functionality of: 1) assembling the bits in the bit-stream into an appropriate defined protocol data units according to the relevant protocol, and 2) processing the assembled protocol data units to provide wire-speed throughput regardless of the protocol encountered. Unlike the specialized adapters prevalent in the prior art, both of these functions in the OPE are dynamically programmable. Thus, either or both the protocol data units for a given protocol or the processing rules that apply to the protocol data units are changeable in a dynamic manner.

For purposes of the present invention unless otherwise indicated, the term protocol refers to a serialized packet communication protocol having defined grouping(s) of control bits and data or information bits (which may be null), all of which follows a set of standard instructions or rules. Table 1 provides an outline of some of the attributes of one embodiment of the omni-protocol engine of the present invention.

TABLE 1

| | Attribute | Details |
|---|---|---|
| 1 | On-the-fly Programmability | in-process redefinition of the machine instruction set for example |
| 2 | Programmable/ Dynamic Multi- Protocol Support | "Standard" and "Enhanced" Ethernet IPv4, IPv6, MPLS Infiniband Advanced Switching/PCI-Express Fibre Channel SONET/ATM User-defined, custom protocols |
| 3 | Programmable Higher Layer Features | Layer 2 to 4 programmable classification Support for 1M flows down to 64 Kbps granularity with aging rules Programmable Traffic Mgmt, Shaping & Policing Protocol Encapsulation VLAN, VSAN, VCAN support Flow Control, Congestion Management |
| 4 | Application Support | Flexible TCP/IP Offload iSCSI, iSER, RDMA MPLS, DiffServ |
| 5 | Industry Standard MIBs | Industry Standard management information bases i.e. a set of variables that conform to the Internet standard MIB II or other Internet standard MIBs. MIB II is documented in RFC 1213, Management Information Base for Network Management of TCP/IP-based Internets: MIB-II. |

Figure 1B:
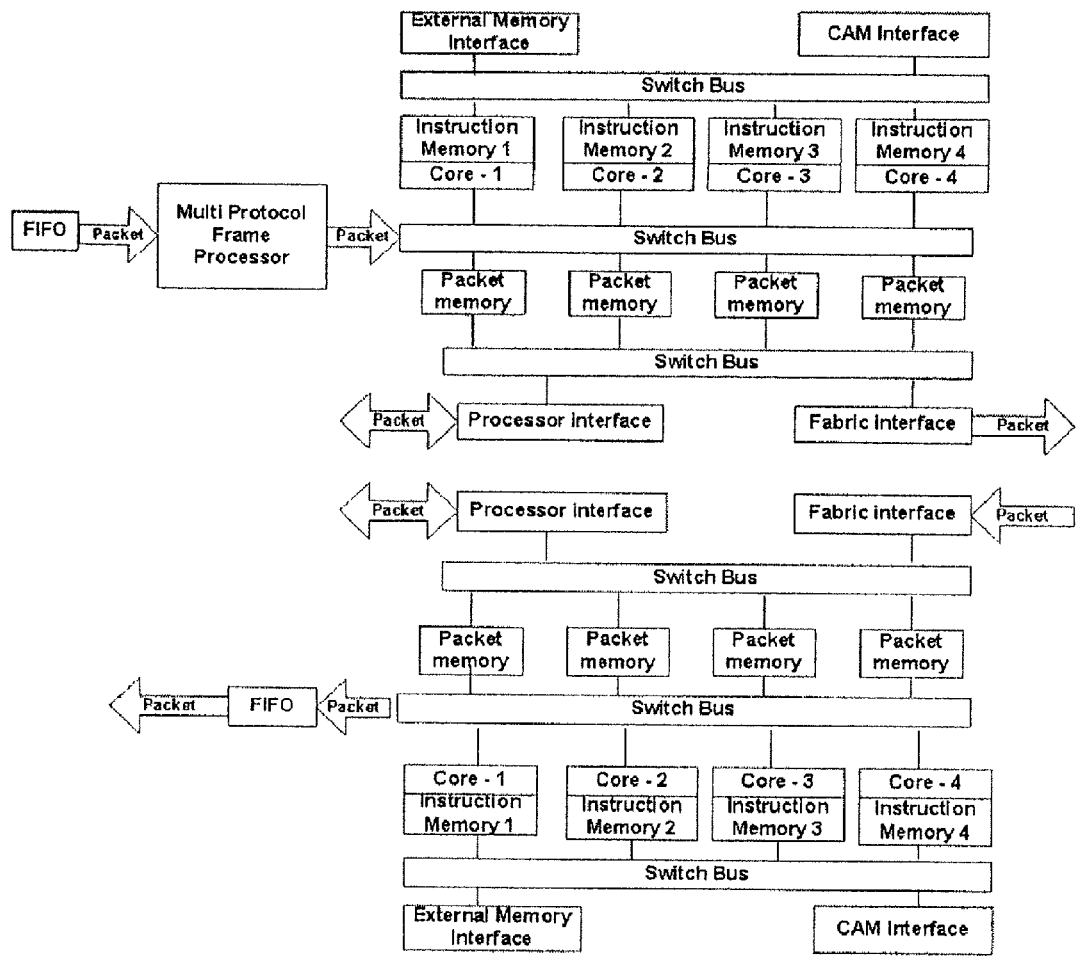

As shown in FIG. 1B, the OPE is a multi-stage processor arrangement in that it comprises several unique processing blocks. Each block is optimized for omni-protocol flow processing functions. Each processing block provides "Gates" along the data path for additional processing at wire speed. The Gate interfaces use both the High Speed Serial I/O lanes as well as the High Speed Parallel lanes to meet the latency requirements of the processing blocks. The states, features and functional parameter of each processing block are preferably programmable "on-the-fly" as will be described. As a result, the OPEs are both re-programmable and re-configurable.

Figure 41:
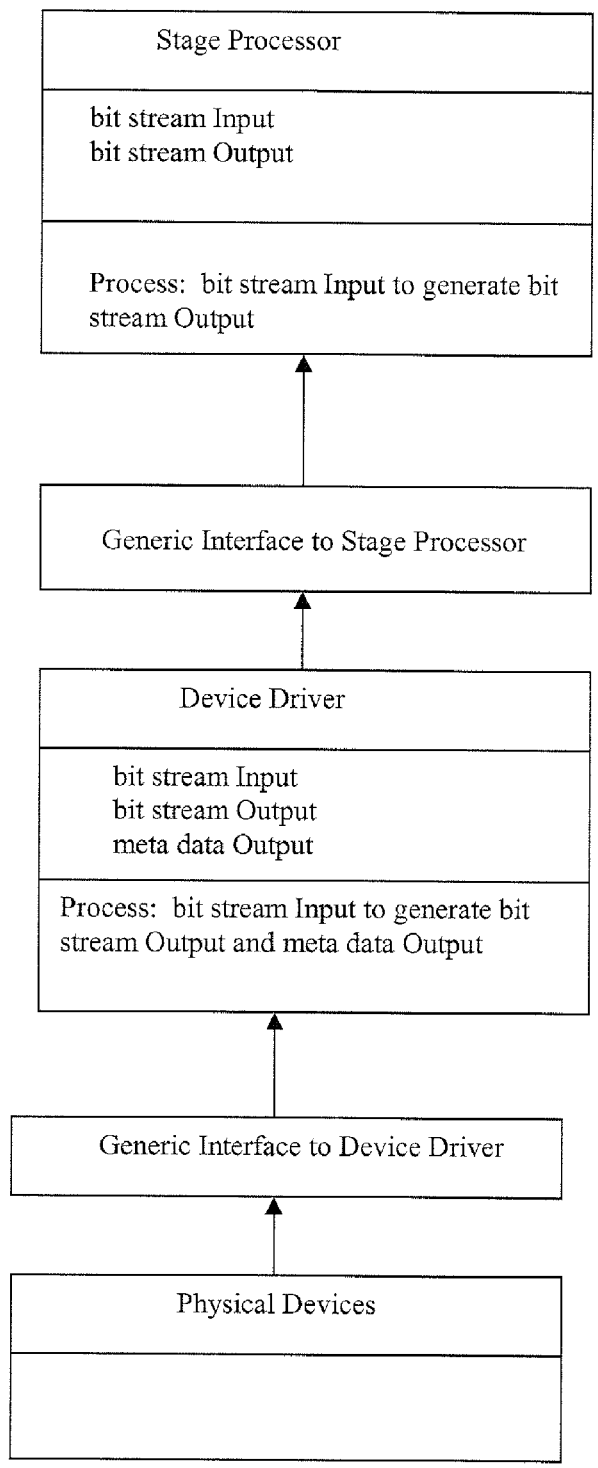
FIG. 41 is a block diagram of the abstraction of the present invention in term of different OSI Levels.

Referring to FIG. 41, at a basic level each stage or processing block can be abstracted in terms of constituent components, data flow dependencies between the components and control structures that alter the data flow dependencies. At the highest level of abstraction, each stage implements a generic interface that implements control structures to enable the stage to accept an input packet flow object and output a processed packet flow object as well as meta data object associated with either or both of the input and processed packet flows. Each stage is a member of a base class. Each base class implements an interface that is specified by the set of methods it implements for the base class. At an intermediate level of abstraction, each base class may be extended by adding additional modules that extend the capabilities of the base class and form a sub-class. Each sub-class implements its own sub-class interface that provides additional methods that extend the functionality of the base class methods. At the lowest level of abstraction, the interface provided by the sub-class can be further extended by providing other methods and/or by adding sub-modules to provide components that did not exist in the base class. The class and its sub-classes are reconfigurable by changing the methods and the objects that the methods will act on. In this manner, each stage of the bit stream processor may be programmably reconfigured to provide differentiated resources and services. In this manner, the various stages are configured into a data (packet) flow machine with a protocol independent architecture.

The frame is defined as a stream of bits, where the meaning of each and every bit is defined by one or more pre-defined protocol framing rules. The abstraction model has a method to accept as input a stream of bits. The meaning of each and every bit is abstracted by the method so that each stage is capable of accepting a stream of bits. Protocol processing is defined by another method which performs a set of actions based on information in one or more bits of the stream of bits, located any where with in the bit stream. Any class or sub-class that can implement such as method can potentially carry out the protocol processing step. In an alternate embodiment, each class or sub-class can be programmed to process a particular protocol by implementing a method in a generic interface presented by the class or sub-class. The details of the implementation are can thus be "hidden" behind the method or methods to allow code and component reuse. The result of the abstraction is that the data flow architecture is essentially a series of pipe lined, predictable latency stages arranged such that the processing in a given stage is completed in the inter-packet gap interval i.e. before the next packet arrives.

The abstraction of each stage permits the addition of one or more pipe line sub-stages to each stage. Each sub-stage in a stage of the pipe line completes its action on the packet in a time equal to the packet arrival time divided by the number of sub-stages with in a stage. Thus, a first stage may comprise of sub-classes that implement methods for packet decoding—i.e it creates meta-data about the data packet. The meta-data may contain information about the location of certain protocol specific bit patterns within an incoming packet stream. In this respect, the packet decoder "analyzes" the frame (a defined stream of bits). Note that the term "implements" is used herein to signify an implementation in terms of one or more of firmware and hardware. Any firmware, hardware or firmware-hardware combination that implements the basic functions described above may be used to implement the methods referenced above. For example, the packet decoding stage may be implemented as a programmable state machine with compare accelerators. Given a protocol type, the PSM extracts the fields in the packet needed by the stage processors for address look-up for instance. The packet decoder performsLayer2/Layer3/Layer4 parsing to extract information from the headers of these three layers. Therefore, the methods that implement this functionality can be tailored to process the protocols of these three layers and thus extend the base class.

In one embodiment, an ingress portion and an egress portion of the data flow processing engine each have multiple bit stream stage processors that are interfaced with a multi-port data flow packet memory. Each bit stream stage processor is provided with a unique instruction memory In one embodiment, a first switch bus is connected between the data flow packet memory and a fabric interface and processor interface and a second switch bus is connected between the data flow packet memory and the multiple bit stream stage processors. In this embodiment, a third switch bus is connected between the multiple bit stream stage processors and a common memory interface. The common memory interface can connect with external memory or with a content-addressable-memory (CAM) interface.

In one embodiment, the OPE supports a set of common processing blocks that are needed for most commonly encountered protocols. Additional features, like compute-intensive protocol processing, can be implemented by adding proprietary programmable, multi function processing blocks. These compute processing blocks are also capable of "on-the-fly" programmability endowing the OPE with the extensibility required to operate in any protocol environment without incurring the type of cost or performance penalty that is characteristic of prior art attempts to attain a converged network fabric. In effect, the OPE enables a converged fabric by providing a multiprotocol processing capability i.e. the ability to merge dissimilar components of a computing center without the need for gateways and switches among the different high speed protocols. The OPE solution works on OSI layers 2-7.

In one embodiment, the processing blocks of the OPE are preferably programmed by means of a GUI based code generator as described in U.S. Pat. No. 6,671,869 entitled "Method and Apparatus for Graphically Programming a Programmable Circuit," the disclosure of which is hereby incorporated by reference. The protocol templates are presented and the actions on the specific fields are dragged and dropped to the action buckets whereby the system generates Communication Engine Code. Additionally, the GUI shows the expected performance of the engine, in "What You See Is What You Get" fashion. The system prompts the user for actions needed to get maximum performance. In a chip environment these capabilities are used to select the appropriate link speeds. In a programmable platform environment, such as for example the FPGA, a higher capacity chip can be selected.

Figure 35:
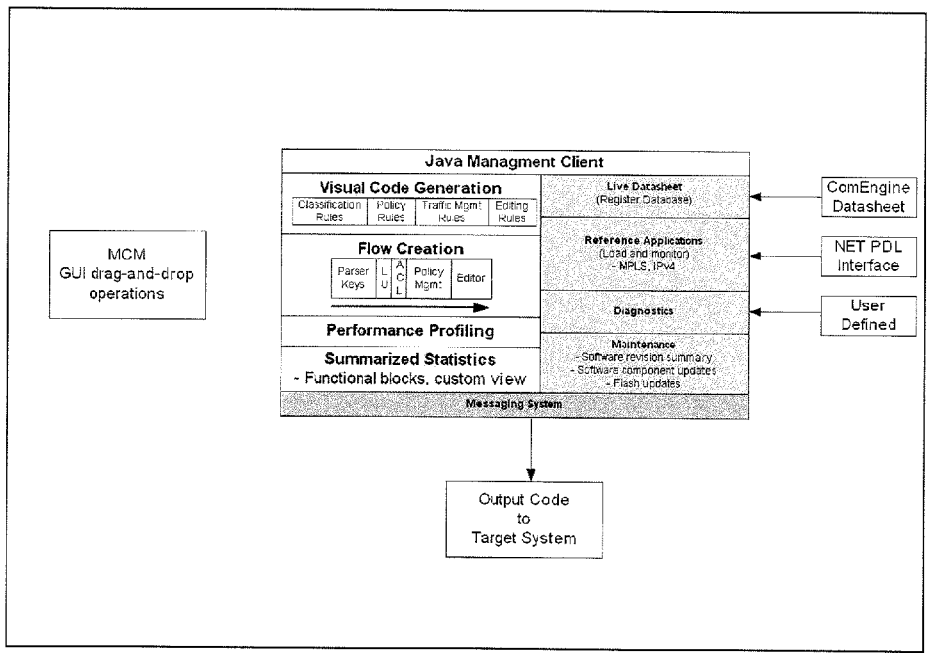
FIGS. 35A and 35B are exemplary of the programming model and environment.
Figure 35B:
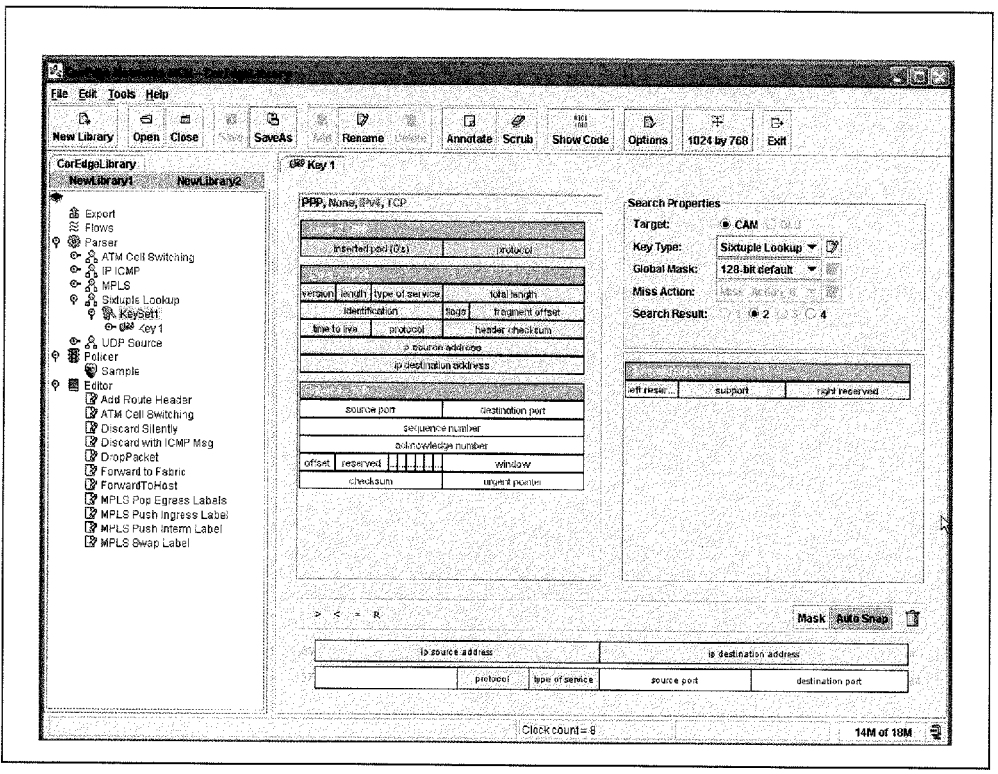

In a specific embodiment of this GUI based code generator as illustrated in FIGS. 35A and 35B, the protocol templates are presented and the actions on the specific fields are dragged and dropped to the action buckets. The system generates Communication Engine Code and shows the expected performance of the engine, in "What You See Is What You Get" fashion. This system prompts the user for actions needed to get maximum performance. In a Chip environment these capabilities could be used to select the appropriate link speeds. In an Programmable platform environment (like the FPGA example earlier) higher Capacity Chip could be selected.

The "on-the-fly" functionality may be provided by, for example, by a field-programmable gate array in conjunction with one or more general-purpose processors (CPUs) sharing a common local bus. One such approach is disclosed in U.S. Pat. No. 6,721,872 titled "Reconfigurable Network Interface Architecture," the disclosure of which is hereby incorporated by reference. An alternative approach for providing such "on-the-fly" functionality is described in "Media Processing with Field-Programmable Gate Arrays on a Microprocessor's Local Bus", Bove Jr. et. al., MIT Media Lab, Cambridge, Mass. 02139 USA, the disclosure of which is hereby incorporated by reference.

Figure 2:
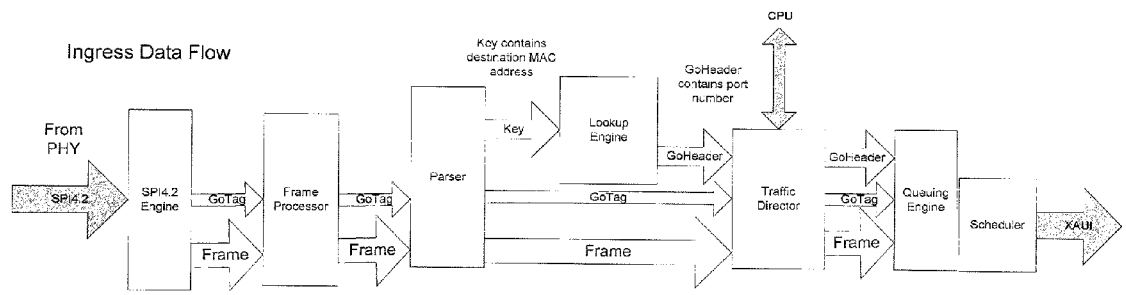
FIG. 2 is a more detailed block diagram of the Ingress Data Flow of the OPE of FIG. 1.

Referring now to FIG. 2, one embodiment of the Ingress Operation of the OPE shown in FIG. 1 will be described. Port Aggregation involves physical layer protocol framing typical of PHY and MAC devices and translating the media specific packet data into SPI4.2 burst frames. Small SPI4.2 bursts from multiple ports are passed to the SPI4.2 Engine in round robin, Time Division Multiplexed fashion. The SPI4.2 channel is divided into time slots based upon the number of ports being aggregated; an 8 port aggregator divides the SPI4.2 channel into 8 equal divisions. Idle bursts are generated on the bus for slots for ports which are inactive or have no data to transfer.

The MAC devices for this embodiment are 8×1 GbE MAC chip ("MAC chip"). The MAC chip will be configured for what is termed "burst-interleaved" mode, which means that a configurable number of bytes (32 bytes, for example) of Ethernet packet data from each 1GbE MAC will be scheduled, in round robin (port 0 to port 9) fashion for transmission to the SPI-4.2 interface. Bursts from the 1 GbE MACs are then interleaved and transmitted on the SPI-4.2 bus. Runt bursts (bursts smaller than 32 bytes) are possible at the start and end of packet delimiters. Operations on the Ethernet Packet performed by the MAC chip include: (1) stripping the preamble and Start of Frame Delimiter (SFD) and (2) retaining the FCS.

The SPI-4.2 Engine preferably includes a core that provides the material functionality of the SPI-4.2 Engine which converts SPI-4.2 framing to an internal framing format similar to SPI4.1. Data arrives from the SPI4.2 bus in bursts of 16 bits, the first 16 bit word of the burst contains a control word that contains information about the burst; including whether the burst is the start of a packet, the end of a packet or the continuation of a packet and a channel number from which the burst was sourced. Up to eight 16 bit data words from a channel are assembled into 64 bit words and passed on, while the 16 bits of the control word are converted to a Internal Routing Tag.

In this embodiment, Internal Routing Tags are passed on the internal bus along with the packet burst data as frames move through the forwarding logic. The Internal Routing Tag contains a bit for Data Valid, one for Start of Packet, one for End of Packet, a bit for Data Error, 3 bits for burst size (0 thru 7 indicates a burst size of 1 thru 8 respectively) and 3 bits for Channel Address. Channel Address indicates the port the burst is associated with. In another embodiment, the Internal Routing Tag may include QOS/COS information based upon network layer prioritization or VLAN designated priorities.

Frame processing by the Frame Processor requires identifying interesting characteristics of the network packet. These characteristics include destination and source addresses, packet type, layer 3 and layer 4 datagram and session addressing. In addition the Frame Processor maintains a state machine for each packet processed by the forwarding logic.

Figure 3:
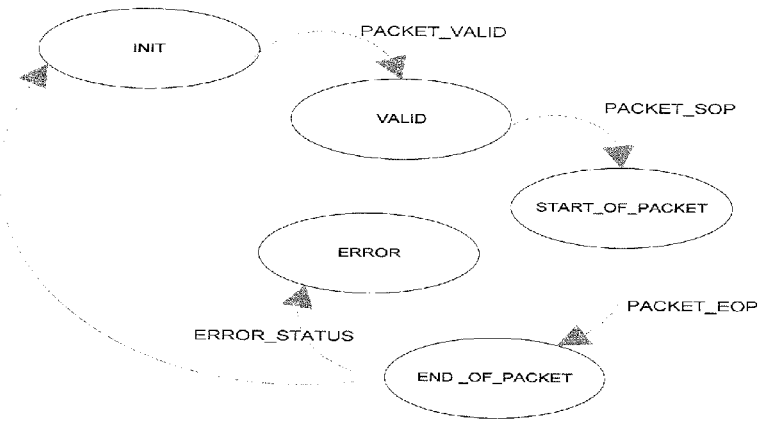
FIG. 3 is a state diagram of a Packet State Machine implemented as part of the Ingress Data Flow as shown in FIG. 2.

As shown in FIG. 3, the Packet State Machine tracks the composition of the data steam. For the HPC solution, a data stream is composed of multiple bursts of packet data which will to be classified based upon bit fields in the SPI4.2 control word. A packet state machine is instantiated for each packet received at or transmitted from the SPI4.2. A packet enters the VALID state when the SPI Valid (PACKET_VALID) signal asserted. When the SPI Start of Packet signal is asserted the packet enters the START_OF_PACKET state and a SPI End of Packet causes a transition to the END_OF_PACKET state. If the error status indicates an error the state machine enters the ERROR state otherwise the state machine transitions to INIT.

Referring again to FIG. 2, the responsibility of the Parsing Engine (Parser) is to construct a multiple tuple Classifier Key from the information provided by the Frame Processor. In one embodiment, only the destination address is necessary for Classifier Key generation. In alternate embodiments, the Lookup Engine may be enhanced to also include any number of packet characteristics or packet/port states when constructing Classifier Keys thus modifying the behavior of the switch as it forwards an individual packet or packet stream.

Using the Classifier Key generated by the Parser, the Lookup Engine will hash into the Forwarding CAM to find the egress destination port. The egress destination port is placed into the Internal Routing Header. In one embodiment, the Internal Routing Header is composed entirely of an egress port number. Alternatively, the Internal Routing Header can include additional information. The Forwarding CAM entries will be accessible to management entities such as SNMP based management stations.

The Traffic Director is responsible for forwarding and/or coping frames to the CPU based upon the port address found in the Internal Routing Header. Appropriate interface logic is provided between the forwarding logic and the microprocessor in the FPGA.

Handling the flow of data between the switch fabric and the frame processing logic of the Port Card is the responsibility of the Queuing Engine. The Queuing Engine contains a virtual queue for each 1 GbE MAC in the switch fabric, in an 8 Port Card switch that adds up to virtual queues. Each virtual queue is large enough to hold multiple jumbo (9K) packets. An index for each virtual queue is maintained to track where in the virtual queue the next 64 bits of data are to be placed, that index is called the VQ enqueue index. The VQ dequeue is consulted to determine the next 64 bits of data that need to be passed to the scheduler. Thus, data from the Traffic Director is placed into the destination port's VQ at the offset indicated by the VQ enqueue index. Conversely, the VQ dequeue index is used to determine what data passed to the Scheduler. The Queuing Engine also provides a Rate Change FIFO between the switch fabric and the Virtual Queues and a flow control mechanism that presents back-pressure between the switch fabric and the forwarding logic.

The Scheduler uses the dequeue mechanism of the Queuing Engine when passing frames to the switch fabric. Frames are scheduled for to be handed off to the switch fabric in a round robin fashion, from port 0 to port 31. Dequeuing involves encapsulating the frame in XGMII before the XAUI Core converts the frame to XAUI. The Internal Routing Tag and Internal Routing Header are used during the conversion.

Referring now to FIG. 3, one embodiment of the Egress Operation of the OPE will be described. The Queuing Engine provides queuing on the Egress side that is the reverse of Ingress. XAUI frames from the switch fabric are converted to XGMII by the XAUI Core. XGMII frames are enqueued to a Virtual Queue based upon a port number in the XGMII frame.

The Scheduler accomplishes egress scheduling in much the same fashion as Ingress. Frames are dequeued in a round robin fashion but the egress data frames must be converted to the local bus interface and an Internal Routing Tag generated. In one embodiment, the Scheduler is designed to be adaptive and heuristic so as to reduce out-of-band forwarding CAM update by just looking for broadcasts and updating the CAM with the source address.

Figure 4:
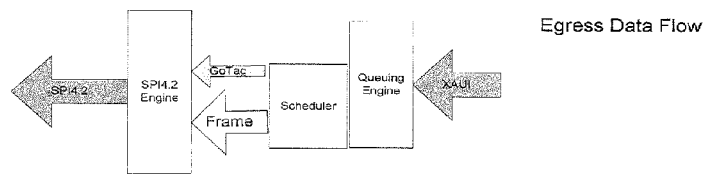
FIG. 4 is a more detailed block diagram of the Egress Data Flow of the OPE of FIG. 1.

Egress SPI4.2 conversion as shown in FIG. 4 is the reserve of Ingress. The local framing format is converted to SPI4.2 using the proprietary core. Egress port aggregation involves assembling the SPI4.2 frame burst data into media packets and transmitting them out through their addressed egress interfaces. Again, these preferably are the MAC chip referenced above. Egress operation is the reverse of ingress. Ethernet packet data is received in the Egress FIFO from the SPI-4.2 in bursts of interleaved Ethernet packet data (port 0 to port 9). When the Egress FIFO receives 5 bursts (or when EOP arrives depending upon packet length) the Egress FIFO will initiate transfer to the 1 GbE MACs. Preferably, egress frame handling also maintains a port state machine which performs frame status checks such as frame aging, VLAN header stripping, internal forwarding header removal, and similar operation. Operations on the Ethernet Packet performed by the MAC chip include: (1) adding the preamble, (2) adding the start of frame detector (SFD), and, optionally, (3) adding the FCS.

Figure 5:
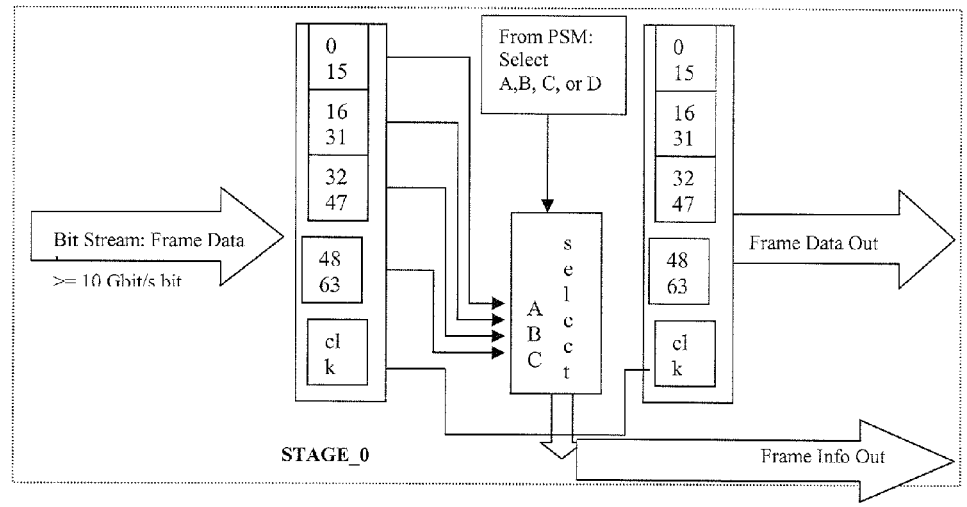
FIGS. 5 and 6 are schematic representations of a pre-processor packet framing system comprising an initial portion of the multi-stage engine according to one embodiment of the present invention.
Figure 6:
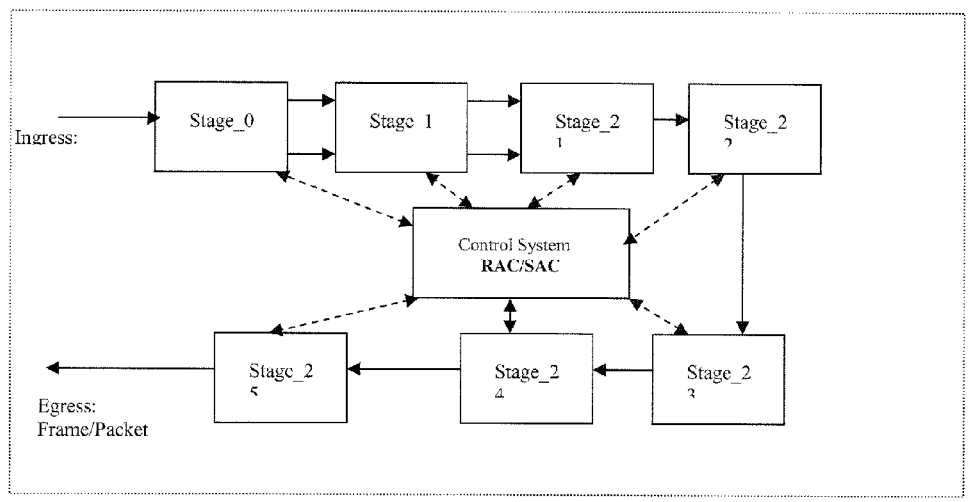

In an exemplary embodiment illustrated in FIGS. 5 and 6, the OPE provides a selected sequence of pipelined stage engines denominated Stage-0, Stage-1, Stage-2 . . . Stage-n. Each stage engine may have a different, extensible and reprogrammable architecture based upon the functionality the OPE is harnessed for. Therefore, unlike the prior art processors where packets are characterized in terms of the software instructions it takes, the instant invention is a data flow architecture with an assembly-line of specialized stages that can be instantiated on-the-fly to reflect changes in data flowing down the line.

Although the invention is not restrictive of the number of ports at the ingress, the invention is best described in terms of data packets arriving at a single port and tracking the life of the packet along a data path through the OPE. It is important to note that each of these data bit-streams may be several bits wide. The width provides a measure of the processing time (or clock cycles) available at each stage engine of the pipeline so as to enable wire speed throughput. Each stage engine is constrained to operate within the particular time envelope by increasing the number of engines comprising each stage if it appears likely that the processing at any one stage cannot be achieved within the time constraints set in the preliminary stage.

Figure 7:
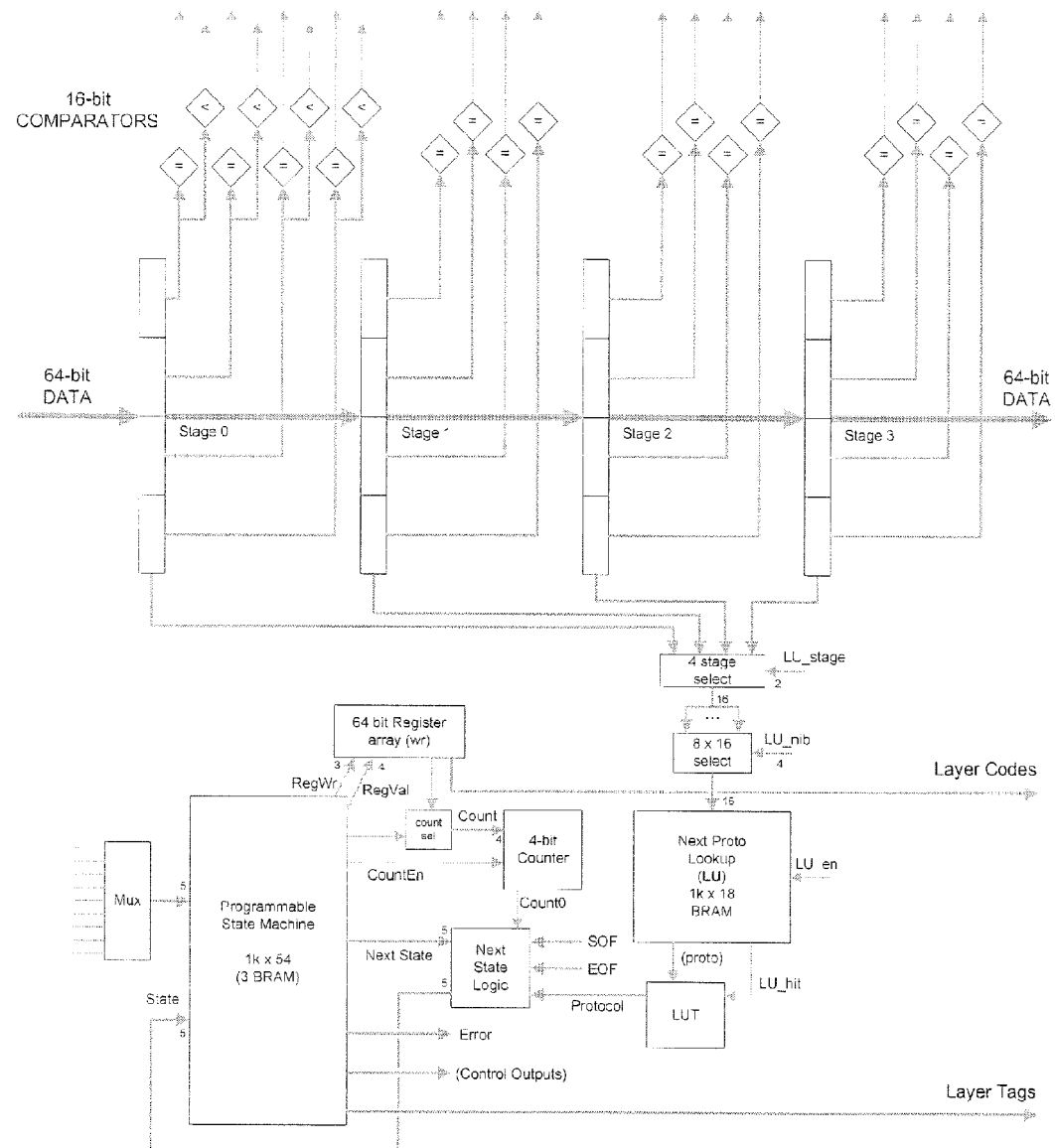
FIG. 7 is a block diagram of one embodiment of a bit stream stage processor in accordance with the present invention that implements a pre-processor.

FIG. 7 depicts one of the embodiments of the instant invention that provides for a Stage-0 engine that is essentially a pre-processor packet framer including in part a programmable state machine (PSM). As the packet comes in 64-bit wide at a time, the framer identifies and distinguishes between various frame types as illustrated in FIG. 1. Framer consist of a programmable memory base state machine, fast memory base lookup table, various comparators along with loadable values, and select logic. The state machine selects packet fields of interest compares against set values or other frame data, which drives the state machine algorithm that marks frames of interest as well as determines the frame type. This information is then passed on to the parser where it helps instruct the parser on how to parse the frame.

For a more detailed description of this embodiment of the pre-processor bit stream processor, reference is made to Appendix A, the disclosure of which is hereby incorporated by reference. *Reference is also made to Appendix B*, the disclosure of which is hereby incorporated herein by reference, which defines one embodiment of the Forwarding Logic Register File.

The OPE preferably includes at least one predictable Programmable State Machines (PSMs). In one embodiment, each PSM is a 32 state machine with a 50 ns/PSM at 156 MHz internal clock equivalent to 5 ns per 10 instructions. Each PSM, however, can have a variable number of clocks. The Stage-0 engine sets the bandwidth processing dwell time by converting the relatively fast serial bit stream to a relatively slow parallel n-bit wide data stream. The bandwidth processing dwell time is adjusted to the line speed. For example, for processing a data rate of 10 Mbps, the dwell time is 50 ns per stage of the OPE.

Preferably, the register base consists of a programmable lookup table preset with values loaded as part of the configuration. These registers are then selected for use with mask, comparators and counters that are integral to the operation of the stage engine. An exemplary configuration of the stage engine configuration is illustrated as follows: The programmable lookup table contains up to 34 16-bit values to be compared. Table output bits correspond to the match if any is made. In the example, there may be 4 8-bit wide comparators, two down counters with a maximum loadable value of 8 bits for a maximum down count of 256. The packet data select width may be a byte and the register value field size represented by 16, 8-bit wide preset registers. The state machine instruction may be a single word instruction (SWI). The set of single word instructions may be selected from the set comprising of set, test, and branch where each field of each instruction may take on multiple stub fields as shown below where each sub field is separated comma and each main field is separated by a semicolon, e.g., SWI: set1,set2,set3, . . . setn;test1,test2,test3, . . . , testn;br1,br2,br3, . . . brn;

In operation, the state machine would undertake conditional branching based on selectable vector inputs. Thus for example, the condition (Frame byte 2==R2) would compare packet location byte 2 of 8 against preset register R2 value. The branching would normally determine the next control state, but could also be used to change the mode of operation of the current state of the programmable state machine.

Referring now to FIGS. 8A and 8B, an application of the pre-processor packet framing method to an incoming Ethernet packet from the XGMII interface is illustrated. From this, the XGMII Interface Block strips the preamble and converts the 32-bit interface into the internal 64-bit representation as shown in FIG. 8B: General Format of Ethernet.

Figure 9:
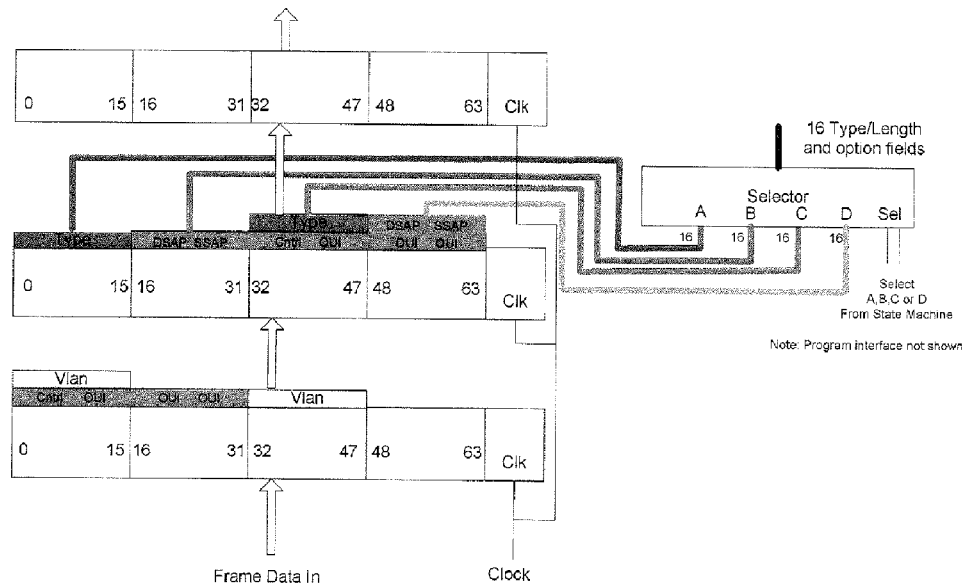
FIGS. 9-11 are schematic diagram of selected portions of the multi-stage OPE.

As the 64 bit wide packets flow through the pipeline, the state-machine selects which 16 bit field it wants to send to the programmable decode ram. See FIG. 9: Packet TYPE Selection and FIG. 10: Programmable decode RAM.

Figure 10:
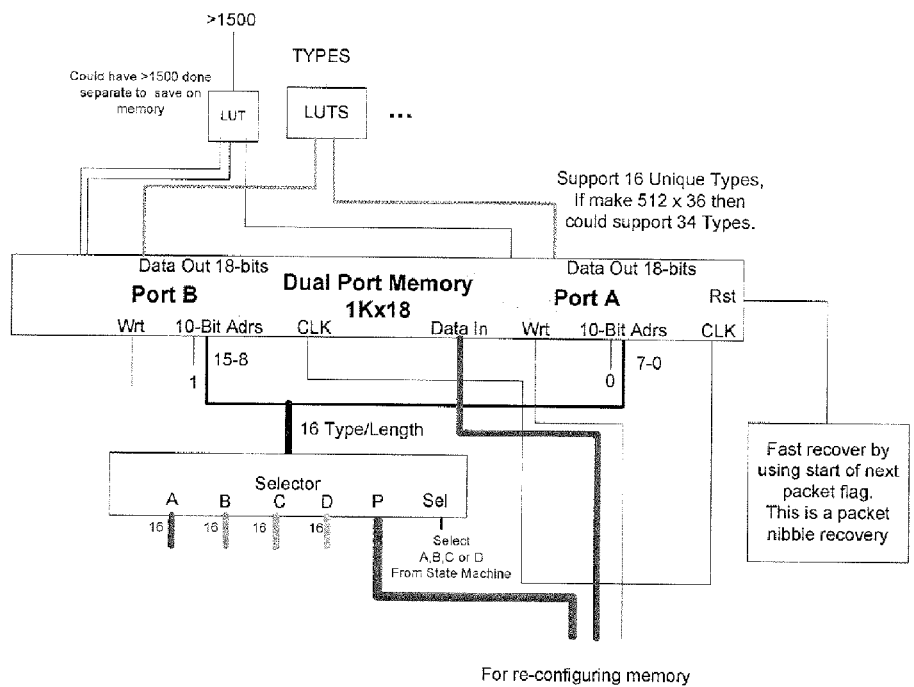
Figure 11:
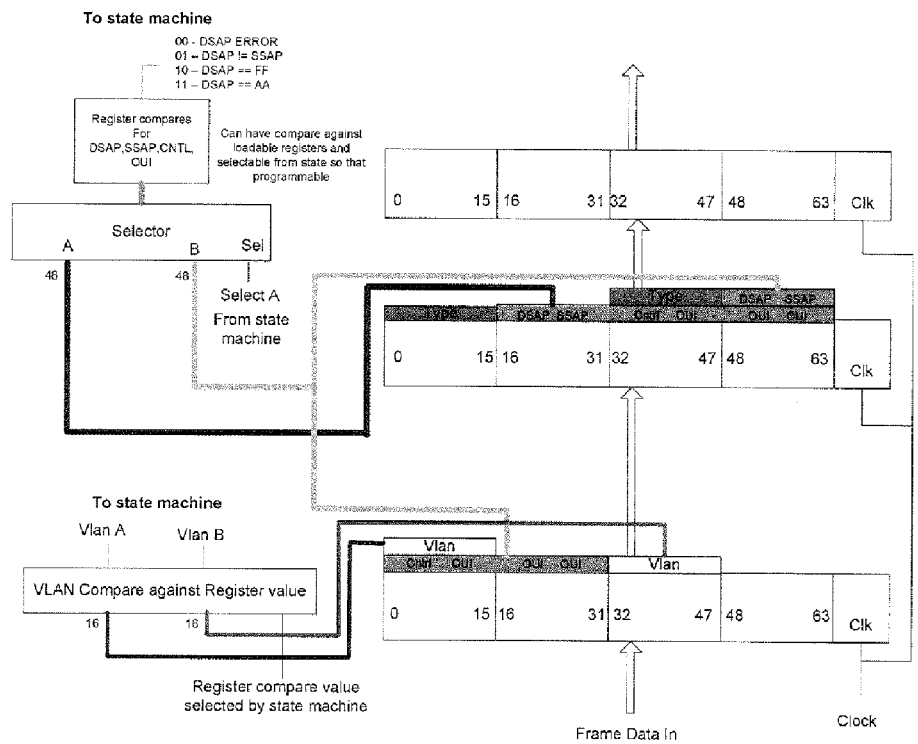

The state machine also selects other information from the packet to be compared against programmable registers with the results feed back to the state machine as shown in FIG. 10. FIG. 10 for example shows VLAN and SNAP input being selected and compared against selected registers with the results feeding back to the state machine for analysis.

Figure 12:
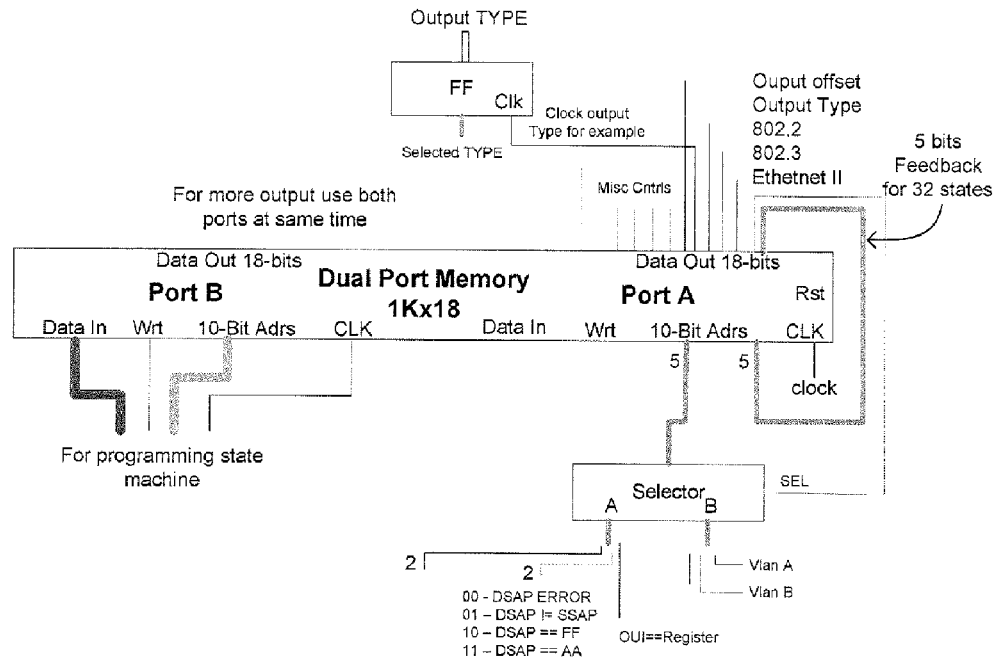
FIG. 12 is a schematic diagram of the programmable state machine of one embodiment of the present invention.

The purpose of the State Machine in accordance with one embodiment of the present invention is to control the extraction of protocol layer header information. This State Machine consists of a programmable block memory with 5 output data lines feed back into 5 address inputs for next state clocking. The state machine other outputs controls various functions for example, frame data to capture, frame layer offset detection and various input selection for the compare logic, as will as the next input to the state machine itself. This state machine is shown in FIG. 12. FIG. 13 shows a state machine table example to help illustrate this.

One objective of this Programmable State Machine is to control the decode and extraction of packet data. The state diagram in FIG. 14 illustrates how this state machine could be setup to handle Ethernet Packet. In this example the state machine only did Ethernet Layer 2 but could as will continued all the way up to Layer 4 for example.

The Decode Ram provides a method for doing fast programmable decodes of selected fields. The input into this Decode RAM circuit is a selectable 16-bit field coming from the packet, and the output is a 4 bit TYPE decode as illustrated earlier in FIG. 10. One method of doing this would be first fill memory with all Zero's then write the decode bits for the Types you want decode. The 16 bit address corresponds to the "Type" and the data corresponds to the decode value that is desired for that type. Under normal situation only 2 bit are set, 1 bit for Port-B, and the same for port-A. The decode bits should be same value for both Port-B and Port-A. An example of this could be if it is desired to have 0x809B AppleTalk Phase 1, to be decode value of "1", 0x8137 IPX (Novell Netware) to be decode value of "2", 0x8847 MPLS Unicast to be decode value "3", and 0x8848 MPLS Multicast to take on decode value "4". The results of this are shown in FIG. 15.

Figure 16:
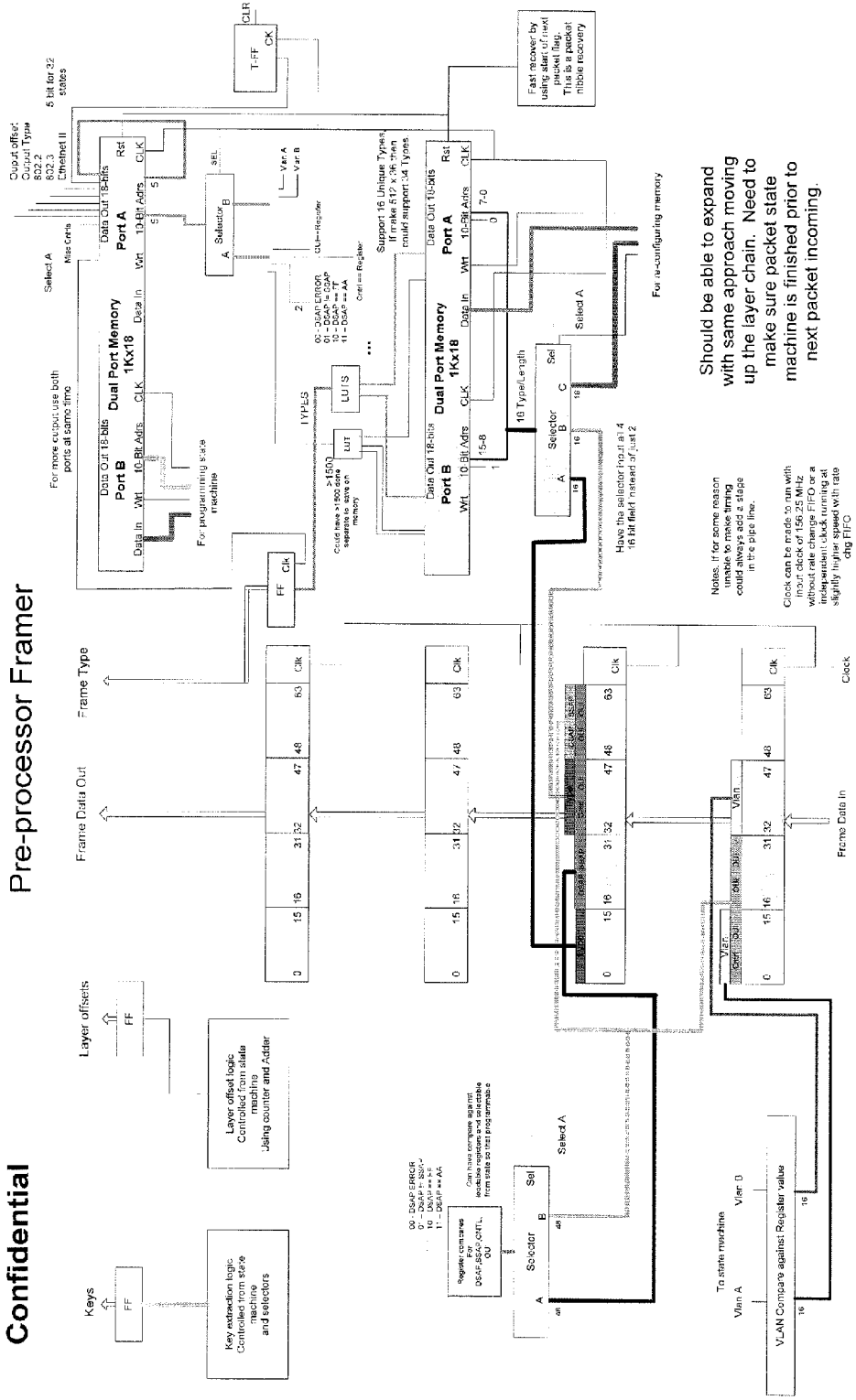
FIG. 16 shows a more complete figure of the basics functions block of the Pre-Processor framer.

FIG. 16 shows a more complete figure of the basics functions block of the Pre-Processor framer.

Figure 17:
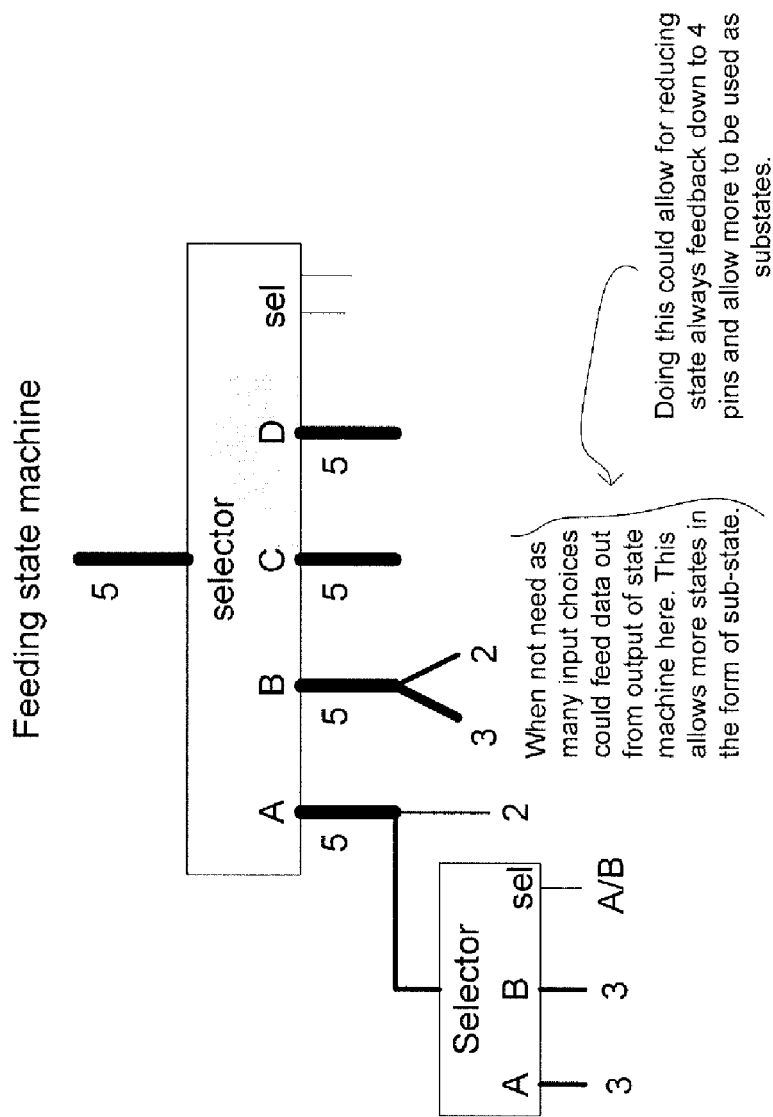
FIG. 17 illustrates a method of increasing input selection, and the ability to have sub state within states.

FIG. 17. illustrates a method of increasing input selection, and the ability to have sub state within states.

Figure 18:
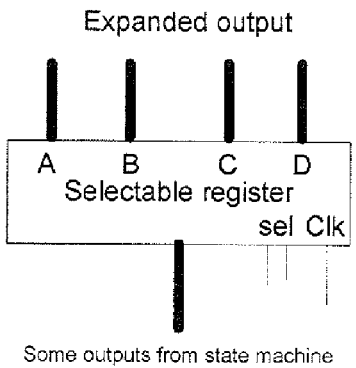
FIG. 18 illustrates a method of expanding the output control coming from the state machine.

FIG. 18 illustrates a method of expanding the output control coming from the state machine.

Figure 19:
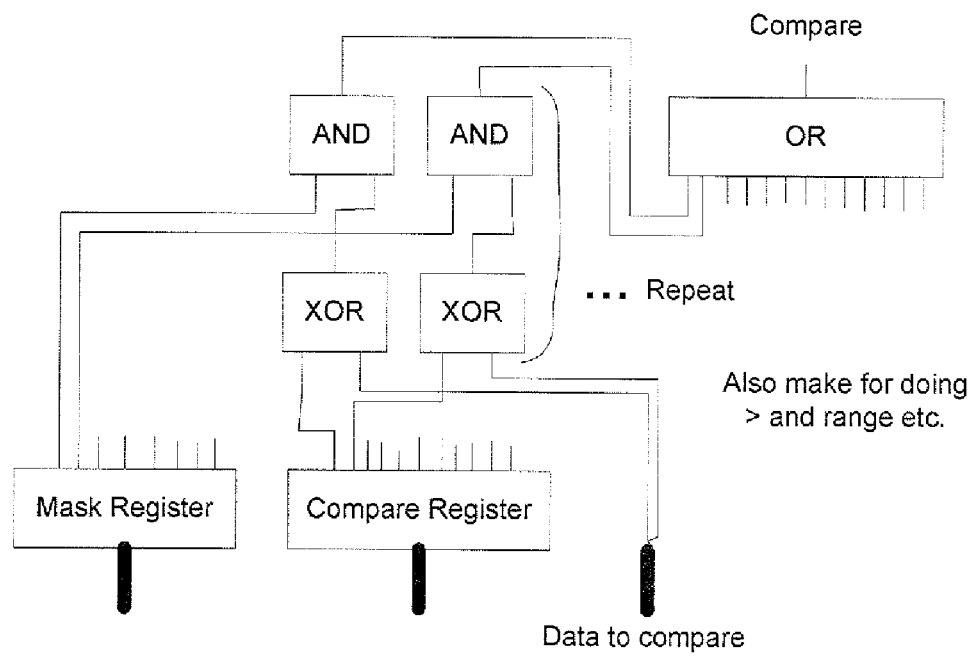
FIG. 19 shows mask compare logic that can be selected by the state machine.

FIG. 19 shows mask compare logic that can be selected by the state machine.

Figure 20:
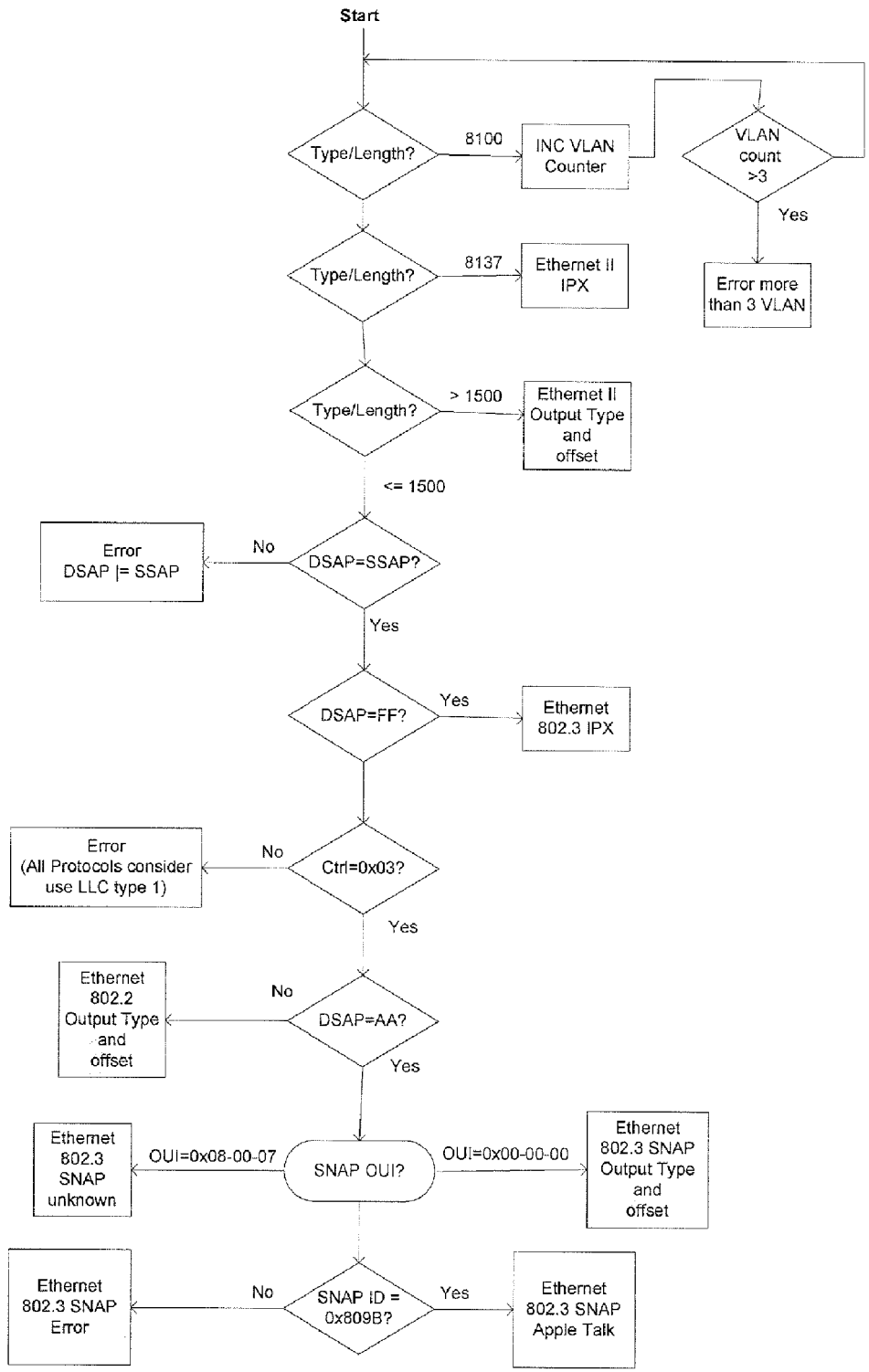
FIG. 20 is an Ethernet flow chart example that could be programmed by this state machine.
Figure 21:
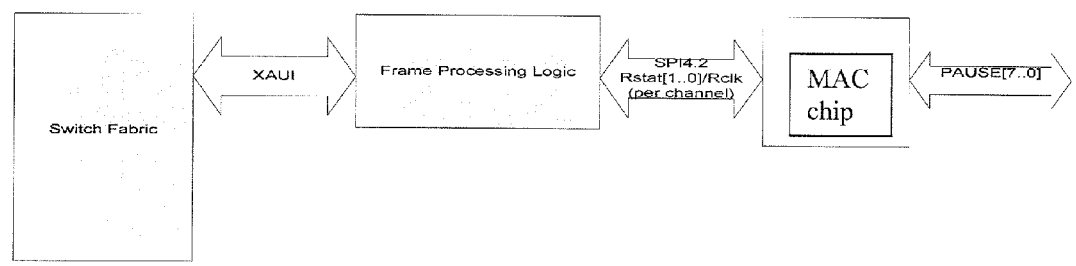
FIG. 21 is a block diagram of the overall flow control in accordance with one embodiment of the present invention.

FIG. 20 is an Ethernet flow chart example that could be programmed by this state machine.

Referring again to FIGS. 5 and 6, the Pre-Processor framer may be configured to provide more flexibility in doing the packet selection, or the ability to do a selectable step back in the pipe line selection. If a greater capability were desired, it could always be provided by adding one or more additional state machines and/or programmable decode RAM. Also note that the RAM that are shown are imbedded in the XILINX as block RAM and can be configured differently and grouped etc. and that this design only showed 2 block RAM being used one for the State machine and the other for the TYPE decode. The smallest Xilinx XC2VP2 has 12 Block RAMS, the next size has 28 and the largest XC2VP125 has 556 Block RAMS.

Figure 26:
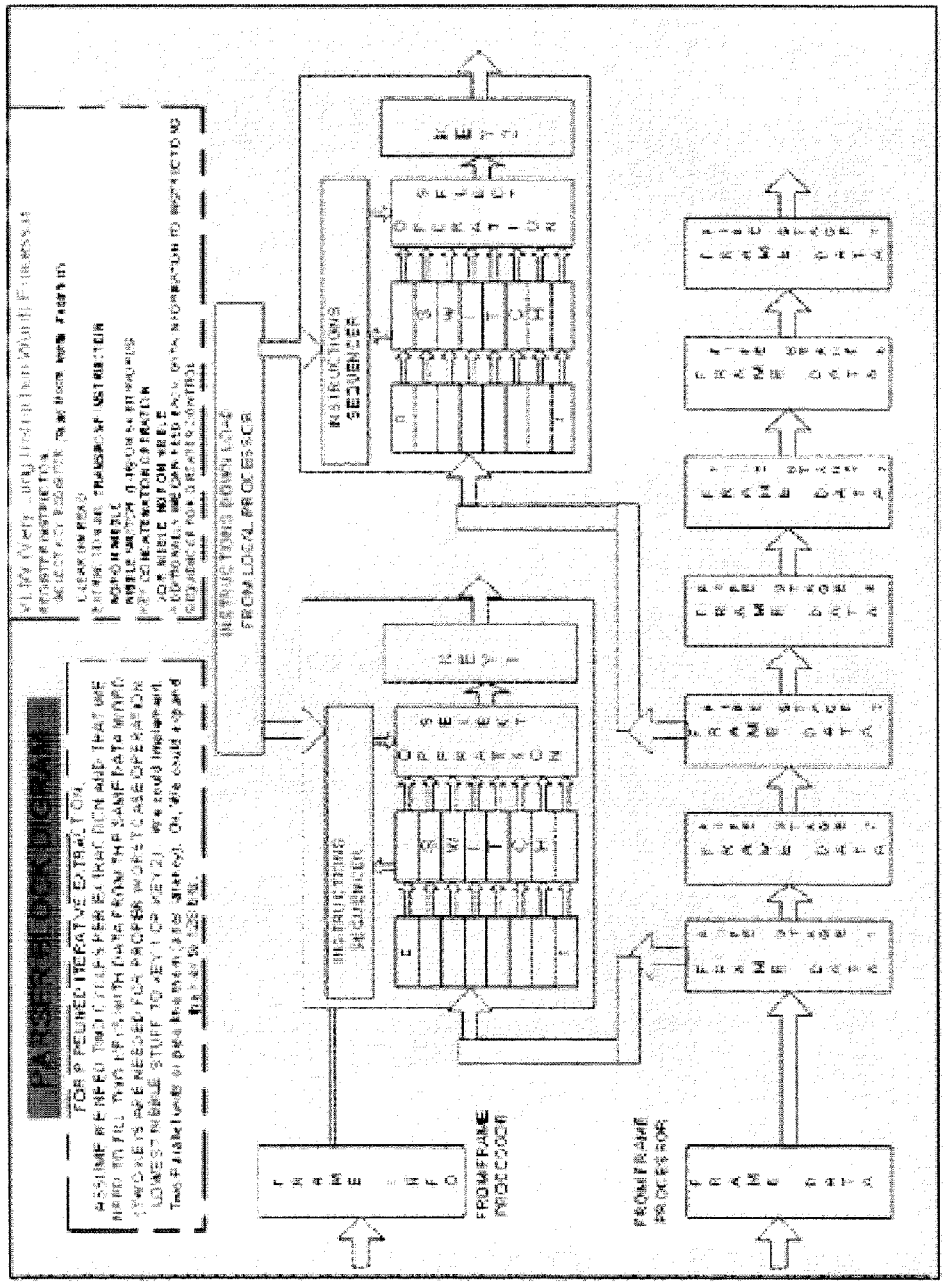
FIG. 26 schematically depicts an exemplary frame classifier according to one embodiment of the instant invention.

In a general embodiment of the invention illustrated in FIG. 26, the datapath of the OPE pipelines from the Stage-0 engine to a Stage-1 engine. The stage 1 engine performs a rule-based classification of packets. A number of engines can be cascaded to obtain the desired results because the classification has to occur within the time interval defined at Stage_0 so that there is true wire-speed throughput. Each engine is based upon a dataflow model instead of the conventional store-and-forward model. One of the outputs of this stage is key generation premised on a prior knowledge of the relevant contents of the packet. In the current implementation, this stage will require two instruction cycles. Each engine employs a single buffer. Unlike a floating-point coprocessor, all engines are dynamically programmable, i.e. the instructions are reprogrammable so that they can be adapted for specific applications. Typically, Stage_1 will comprise at least one very long instruction work (VLIW) processor. In an alternate embodiment, the Stage-1 engine may be configured in the manner of the task-customized processors as previously described.

Figure 27:
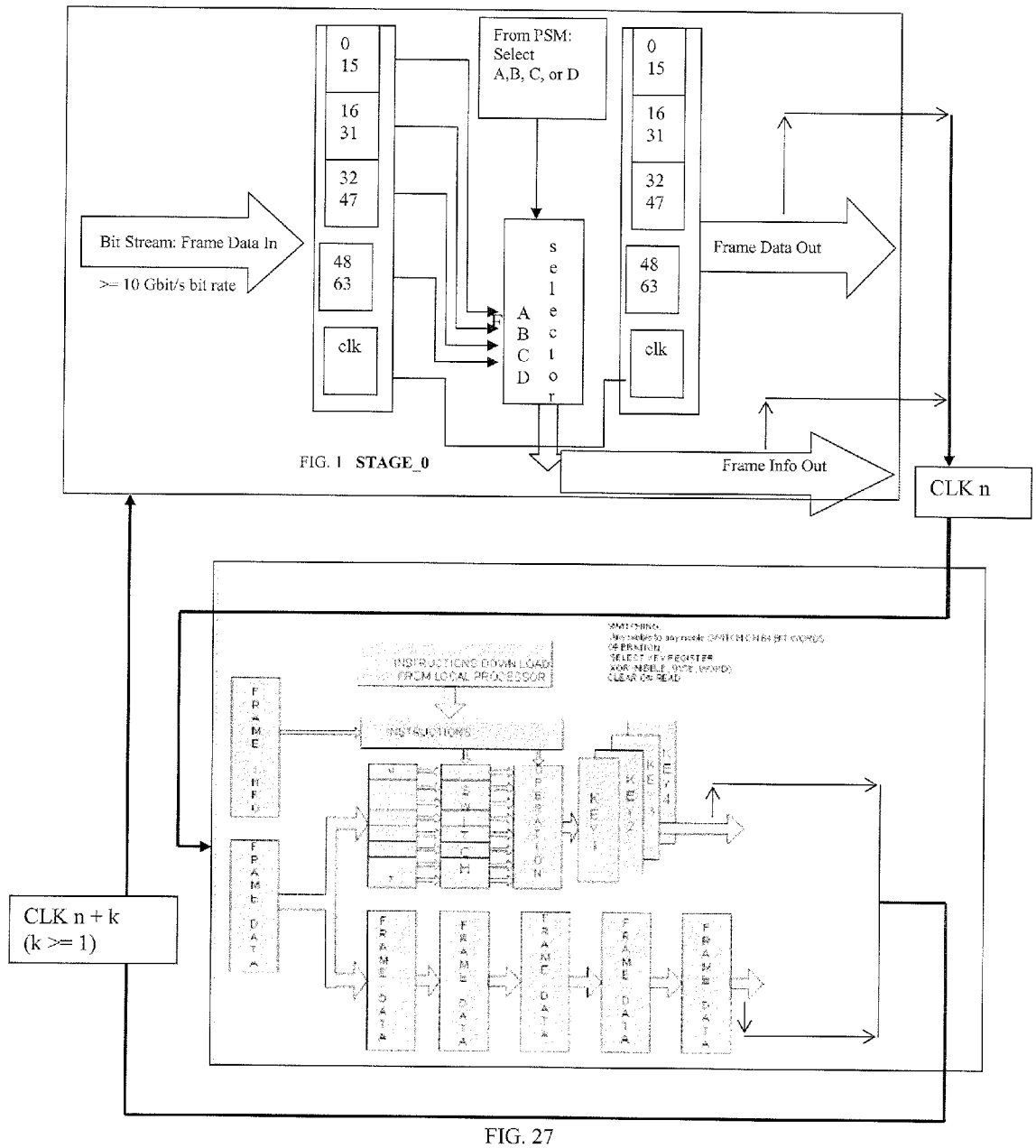
FIG. 27 illustrates Stage-0 and Stage-1 engines operating in a feed back loop according to an exemplary embodiment of the instant invention.
Figure 28:
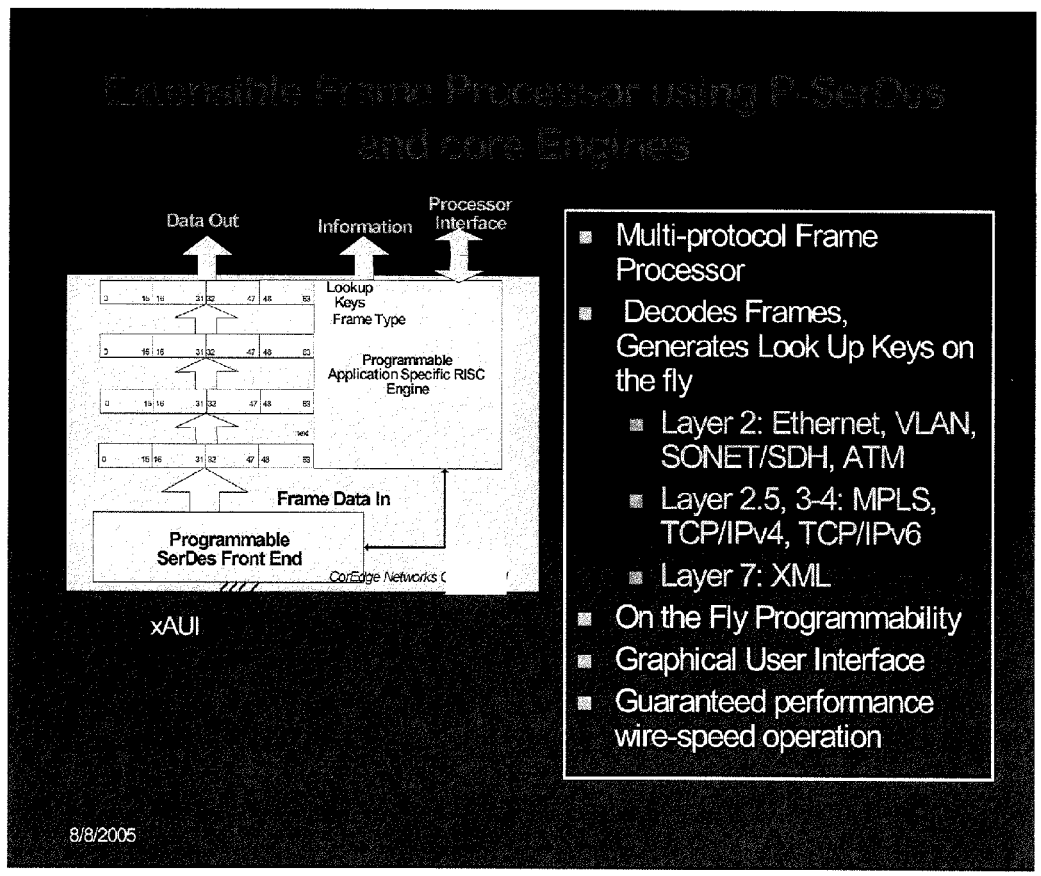
FIG. 28 is a schematic of an extensible frame processor according to a specific embodiment of the invention where the frame processor includes P-SerDes and core engines.
Figure 29:
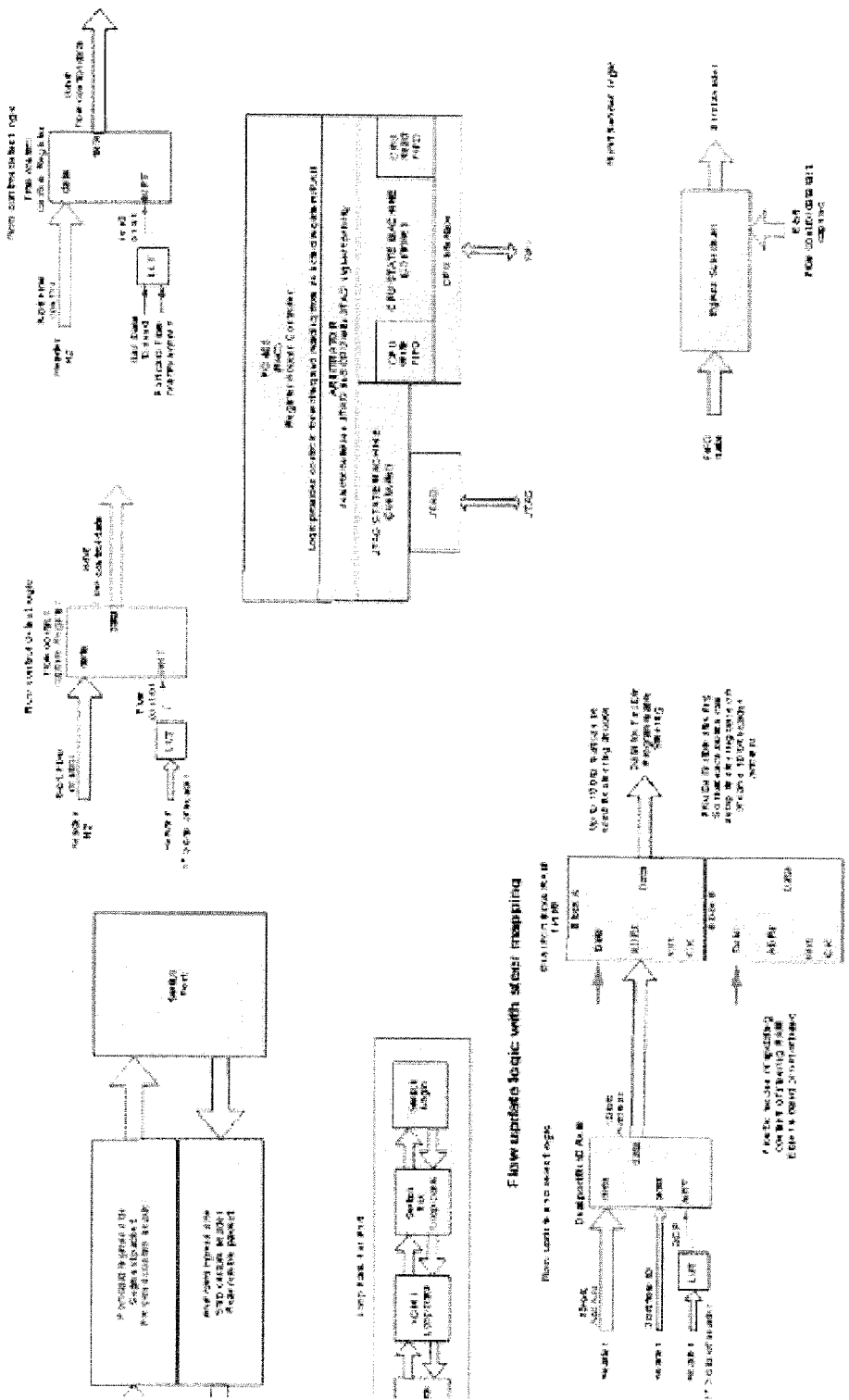
FIGS. 29, 30 and 31 schematically depict a HPC port card featuring the Omni Protocol Engine of the instant invention.
Figure 30:
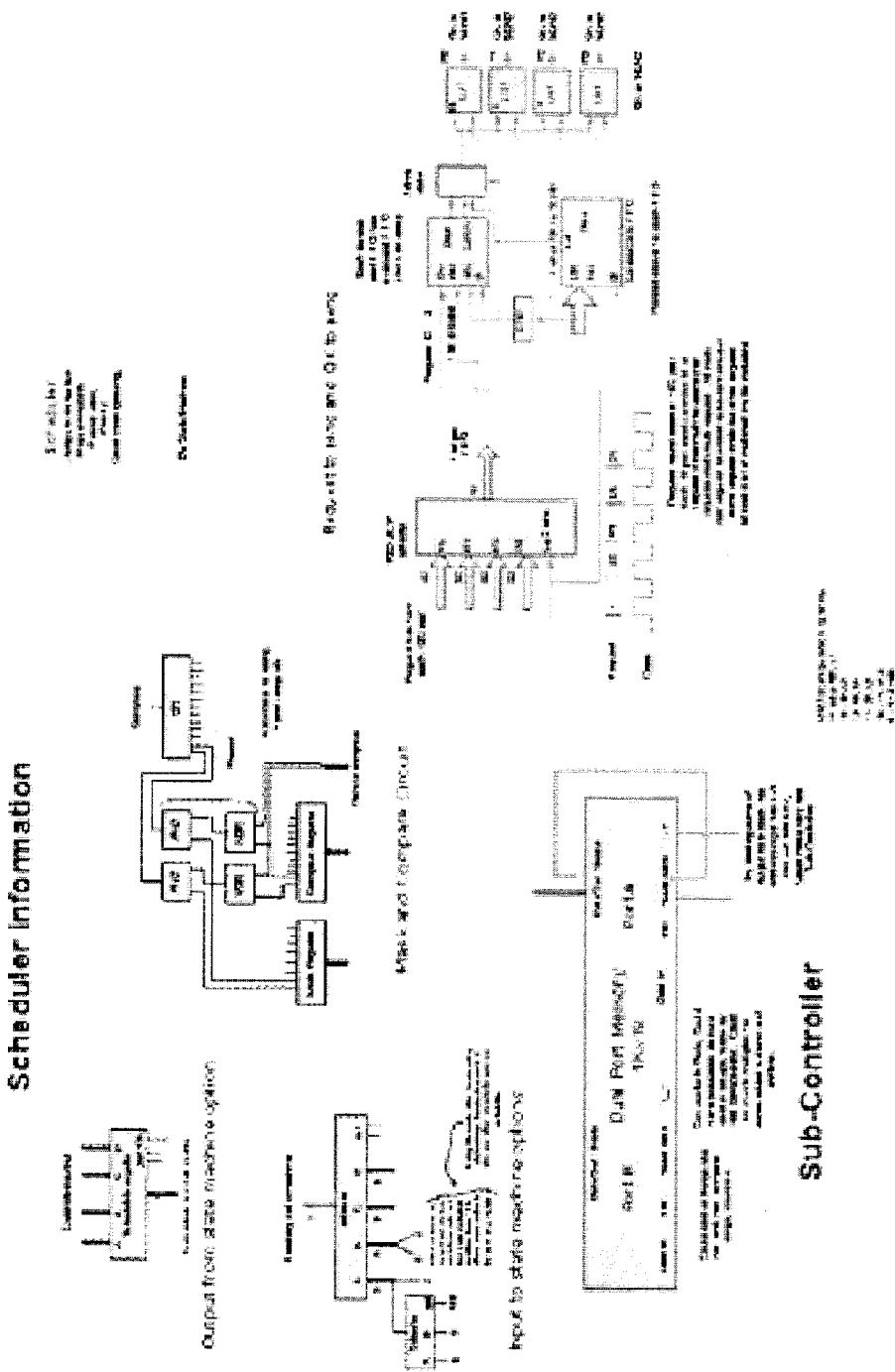
Figure 31:
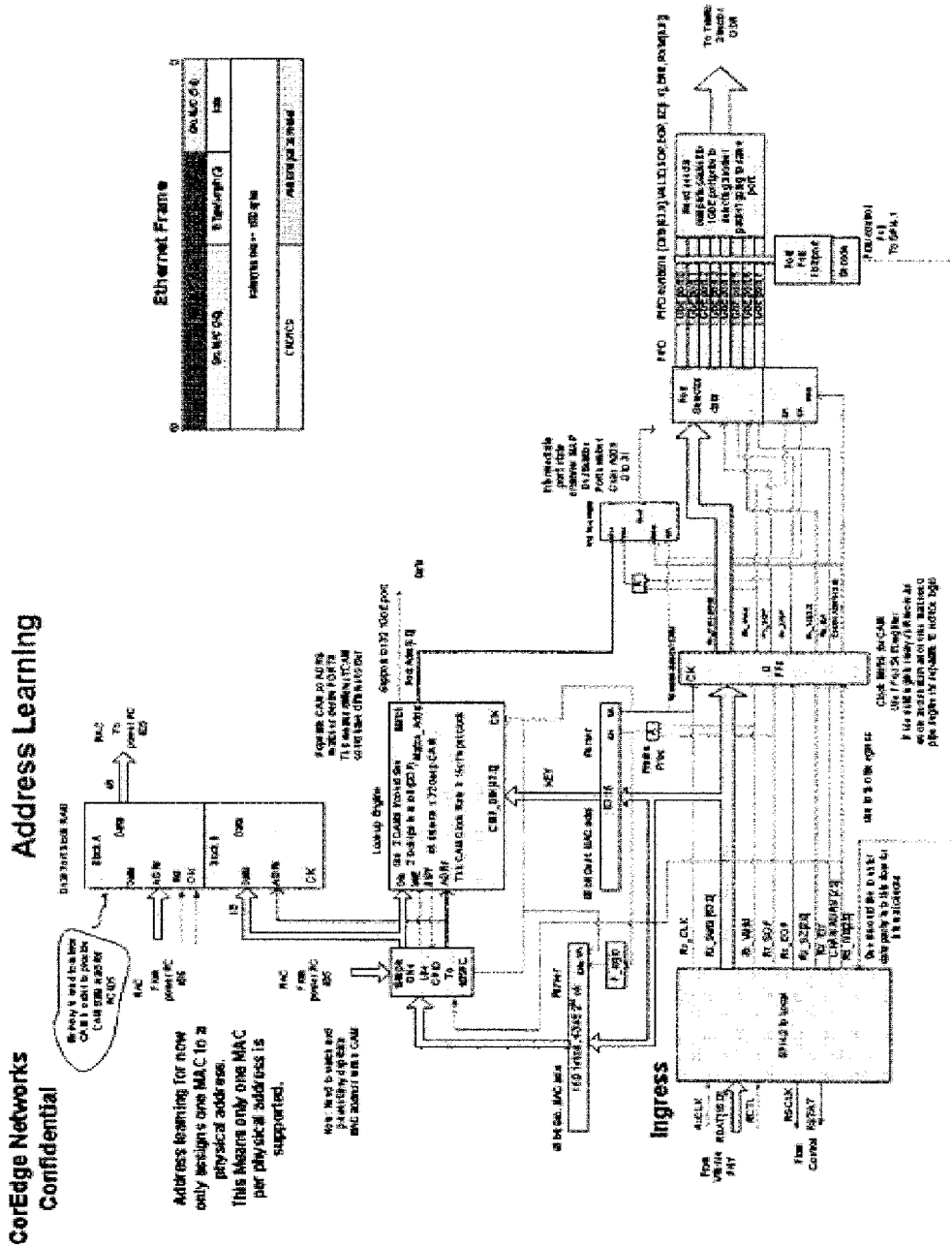

In a specification embodiment of the invention illustrated in FIG. 27 the Stage-0 and Stage-1 engines operate in a feed back loop with the state information of the Stage-0 bit-stream processing using the PSM being passed onto the Stage-1 classification engine and the information from the classifier being fed back to inform the operation of the Stage-0 engine. The feed-forward/feed-backward engine architecture makes it possible to take a bit-stream of contents of any given flow, from the multiple flows that may be supported by the OPE, parse (or classify) the contents as the data flows through the engine and feed information obtained by the operation back to the previous stage so that the next operation is based on the prior state as well as the classification result of the prior state.

Such an approach can be advantageously used, for example, to process variable length/variable protocol packets, dynamically reorder out of sequence packets or for other error control functionality. The elemental unit of data becomes a bit with the feed-back and feed-forward providing the system memory or glue that allows each bit to relate to each bit that has gone before it and that follows it. This paradigm can be scaled to inject a "memory" into the system of macro-elemental data structures such as a byte, word, a frame or an entire session depending upon the particular objective of the stage but without incurring the latency and hardware overhead of store-and-forward architectures. Such macro-elemental data structures could be ephemeral in that they persist while the data has a particular characteristic and are used to reprogram the behavior of the OPE for all subsequent data flows. In this manner, unlike conventional protocol processors whose operation is hardwired, the OPE is an adaptable hardware device which adapts to an evolving data flow but in a deterministic manner i.e. the "state explosion" characterizing the prior art attempts to provide a solution by expanding the number of state machines and states to handle increased data flows is overcome in the solution provided by the present invention.

Figure 40:
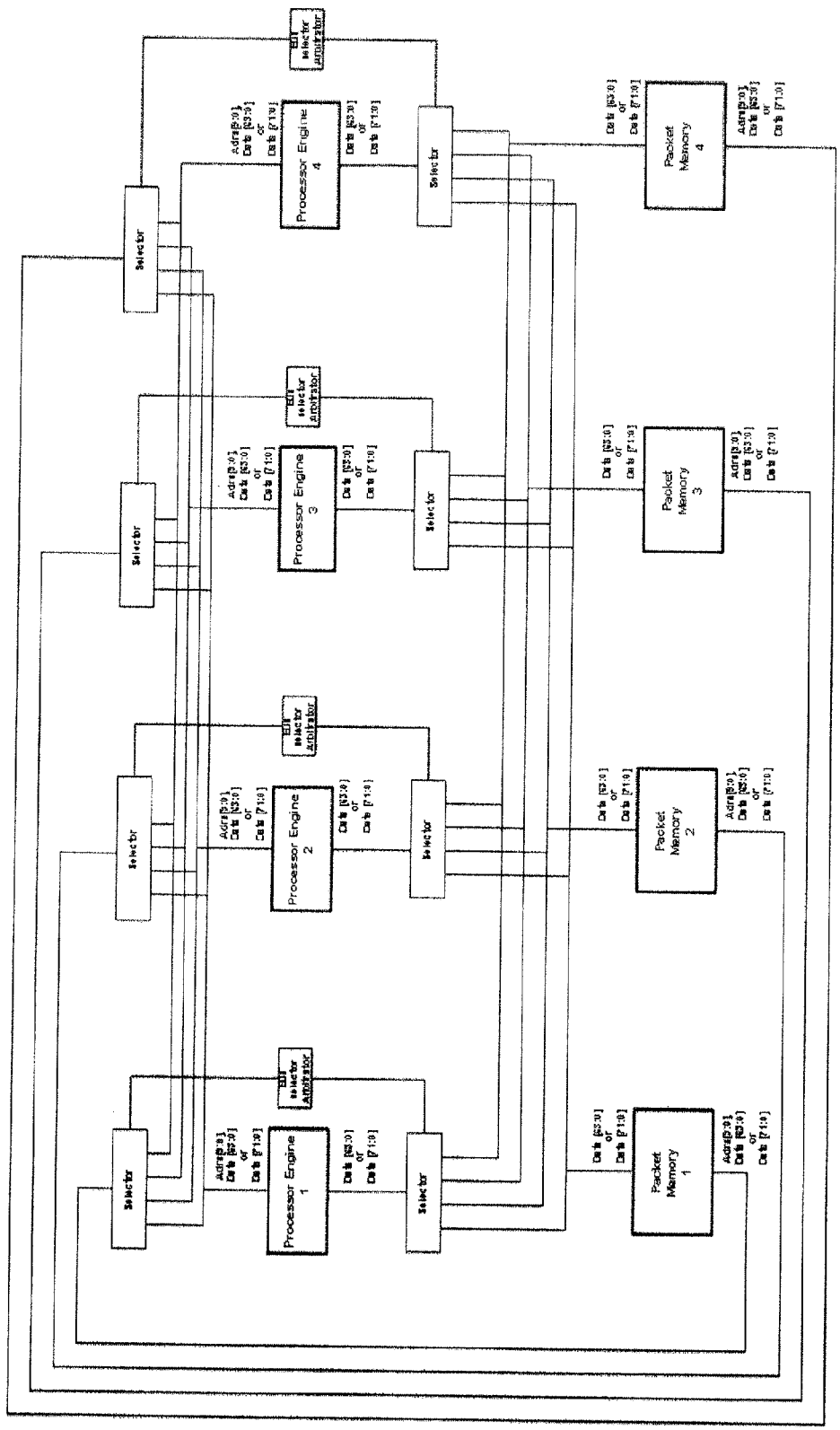
FIG. 40 is a block diagram of the data flow arrangement in accordance with one embodiment of the present invention.

One embodiment of a data flow arrangement that implements an embodiment of the present invention for multiple stage bit stream processors is shown in FIG. 40.

One of the attractive features of the multistage methodology is that the parameters of the various Stage engines are effectively decoupled. For example, there is no need for a common clock between the various stages. This significantly simplifies the design of the OPE. Each stage may be populated with one or more engines that are tailored to the operational need of that stage at any given time. Each engine may be reprogrammed on the fly to endow it with functionality that matches the characteristic of a data flow encountered by the OPE at the particular point in time.

In a general embodiment of the invention, the Stage-2 engine is followed by a Stage-3 engine. The Stage-3 engine provides higher level control plane functionalities such as routing, signaling, protocol stack, policy definition, table maintenance, interface to the data plane and so forth. Like the previous stages, Stage-3 has specialized engines that may be replicated to match the processing time and functionality requirements imposed on the OPE. FIGS. 28-31 illustrate an extensible frame processor with P-SERDES and Core engines and a HPC port card featuring the OPE of the instant invention.

In one embodiment, illustrated in the aforementioned figures for example, a 32 entry by 48 bit CAM on each Port Card in the switch. Each entry represents a particular port in the switch. Thus, the first entry in a Port Card forwarding CAM represents port one of the switch. It will be noted that these CAMs may be increased in size to accommodate multiple nodes on attached LAN segments. Preferably, an aging mechanism is defined that will keep only practical entries in a Port Card's forwarding CAM. Since HPCC does not utilize LAN segments, the aging mechanism may not necessary.

As one of the design goals is to allow access to the forwarding CAMs via SNMP, an SNMP agent running on the Shelf Manager will need read/write access to the forwarding CAM cache resident on the Carrier Card. Changes to the forwarding table cache will be pushed down the Port Cards via the update CAM IPMI message and processed as described above Dynamic MAC Address Learning. In order for a switch to forward packets between any two switch ports a lookup must be performed on the destination MAC address to find a destination switch port where the incoming packet will be sent. The lookup table (also known as a forwarding table) preferably will contain a 48 bit value that contains a destination MAC address along with a 6 bit switch port identifier. The forwarding table maintained by the switch is distributed among the forwarding tables managed on the individual Port Cards. These forwarding tables (which will be implemented in hardware by CAMs) will need to be populated. There are two methods for populating forwarding tables; dynamically and statically. Static population of these CAMs will be achieved by exposing the forwarding CAMs to a management entity via an SNMP enterprise MIB similar to the forwarding database described in RFC 1493.

One of the goals of this design is to moderate the use of broadcast and multicast packets. This is because broadcast frames are expensive in terms of bandwidth and switch resources and multicast frames are even more expensive. An exhaustive search was performed to find a method for this switch to dynamically learn the MAC address(es) on the LAN segments attached to each switch port no matter what topology the switch may be deployed and do this without the use of broadcast or multicast packets and no modifications to the attached port network logic. At present, there is no single method or set of steps that will allow the switch to dynamically, in all cases, determine all MAC addresses that may be connected to a switch port. In short, the Internet or an Intranet as defined by IETF RFCs expect the switch/bridge/router to either passively learn the MAC address of attached or the switch/bridge/router provides a mechanism for a management to statically populate forwarding tables.

Thus, the switch in accordance with this embodiment of the present invention will emulate the behavior of a learning bridge. Incoming broadcasts, such as a standard Ethernet Frame illustrated in FIG. 23, will be parsed and source addresses placed into the appropriate forwarding CAMs. This will be accomplished by the embedded FPGA microprocessors independent of the packet forwarding logic inside the FPGAs. The following illustrates the dynamic MAC address discovery:

A broadcast packet is received at a switch ingress port. The packet is passed through the forwarding logic until the Traffic Director hands the frame to the Mobile Management Controller (MMC) via a frame FIFO.

The MMC will extract the source address of the data link layer header.

The MMC will encapsulate the source address and the ingress switch port number into an IPMI message and forward the message via the SPI based IPMI bus to the microprocessor on the Carrier Card (IPMC).

The IPMC will capture the source address and switch port number in a forwarding table cache that will be assessable by an SNMP based management entity via RAC.

The IPMC will broadcast the CAM update message to the all other MMCs in the switch.

The internal microprocessor will receive the CAM update message and update its forwarding CAM by placing the MAC address of the CAM update message into the CAM entry at the offset represented by the switch port number.

It will be noted that this entire forwarding table procedure may need to be modified extensively to support more robust topologies. i.e. multiple nodes on attached LAN segments.

Preferably, a 32 bit wide FIFO that is read by the internal microprocessor to access selected frames in the data stream. The FIFO will be written by the forwarding logic with the Internal Routing Tag and the first 32 bytes of the incoming packet. A status register is read to determine when the FIFO is empty.

Figure 22:
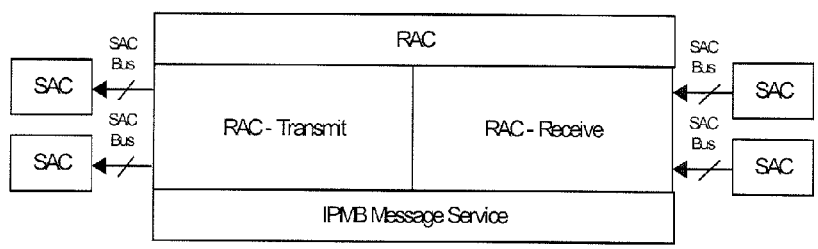
FIG. 22 is a schematic illustrating the operation of the RAC/SAC to monitor and control the operation of the interconnected Stages of the OPE.

As previously described, FPGA control and status register files are accessible through a Register Access Control mechanism whereby IPMI encapsulated messages are directed to the microprocessor in the FPGA who then performs the actual register read or write. In one embodiment, the microprocessor acts as a Register Access Controller (RAC) who interprets the RAC message, determines which forwarding logic element/Sub-module Access Controller (SAC) the message is addressed and facilitates the register access with the SAC. Resulting status/response is return to the message originator. FIG. 22 shows a block diagram of one embodiment of the SAC bus. It will be understood that the SAC Bus is unique to the sub-module and may take many forms.

IEEE specifications state that the destination address of the PAUSE packet may be set to either the unique DA of the station to be paused, or to the globally assigned multicast address 01-80-C2-00-00-01 (hex). In addition, packets with the PAUSE packet multicast address will not be forwarded by a bridge which ensures the frame can not propagate beyond the local link segment. The MAC Control Parameters field designates the number of bit times to pause, from 0 to 65535. A PAUSE received before the expiration of a previous PAUSE period, results in the new bit time value replacing the current PAUSE period value. This allows the PAUSE period to be reset to zero, allowing traffic to resume Preferably, the MAC chip accommodates two modes of flow control. When configured in full-duplex mode the MAC chip can automatically generate PAUSE packets. Back pressure from the SPI-4.2 bus causes the MAC chip ingress FIFO to fill, by setting appropriate high and low watermarks the MAC chip will manage start and stop PAUSE signaling. The second mode bypasses the FIFOs and relies on SPI-4.2 flow control messaging to generate PAUSE start and stop packets.

Figure 25:
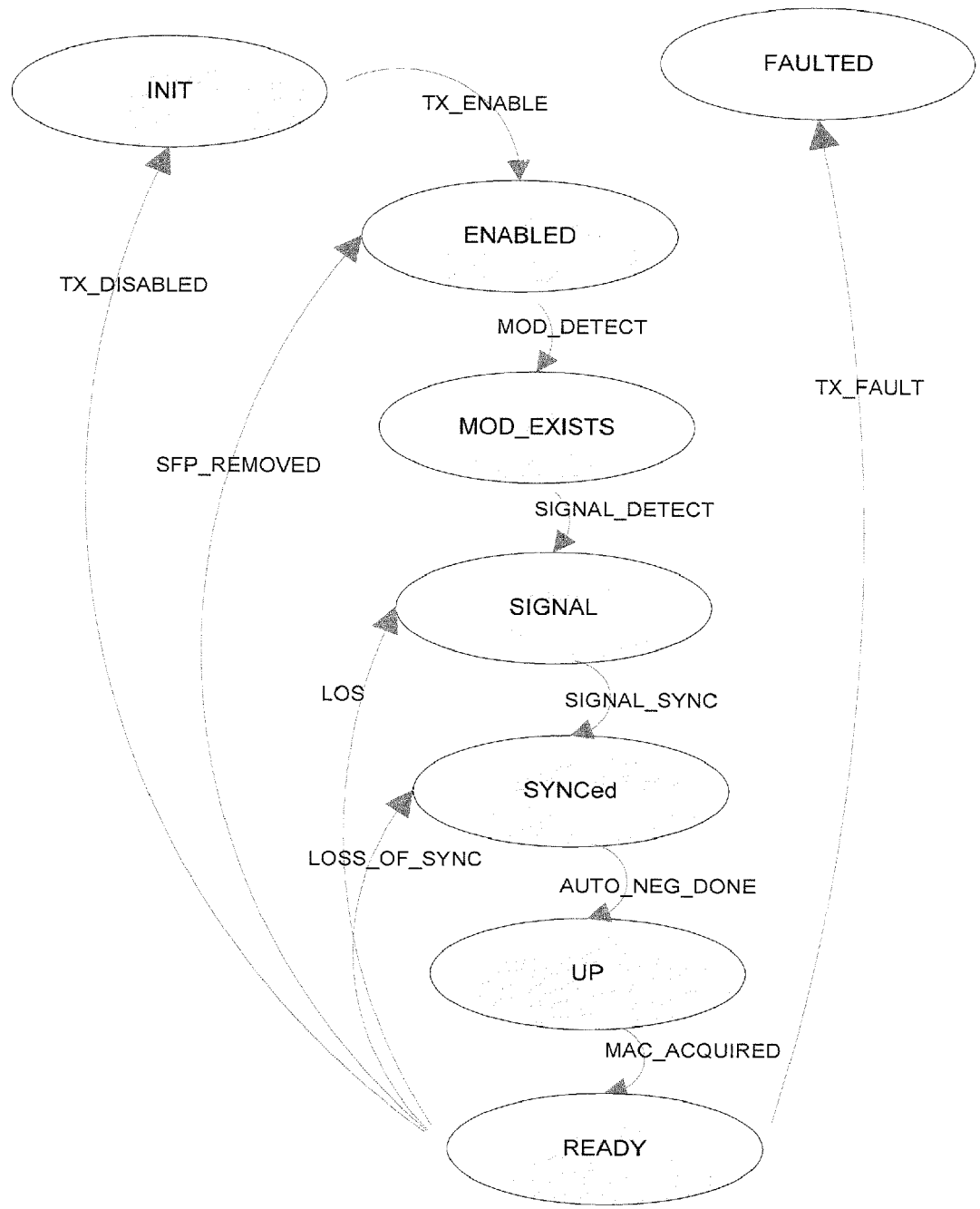

A port state machine will be maintained for each switch port on a Port Card. The state machine will be accessible by both the FGPA logic and microprocessor. The state machine as explained in this document contains three basic elements; an event, a defined state and the action performed when entering that state. The events defined above trigger state transitions into states which in turn perform actions as the diagram in FIG. 24 and the state diagram in FIG. 25 show.

Figure 32:
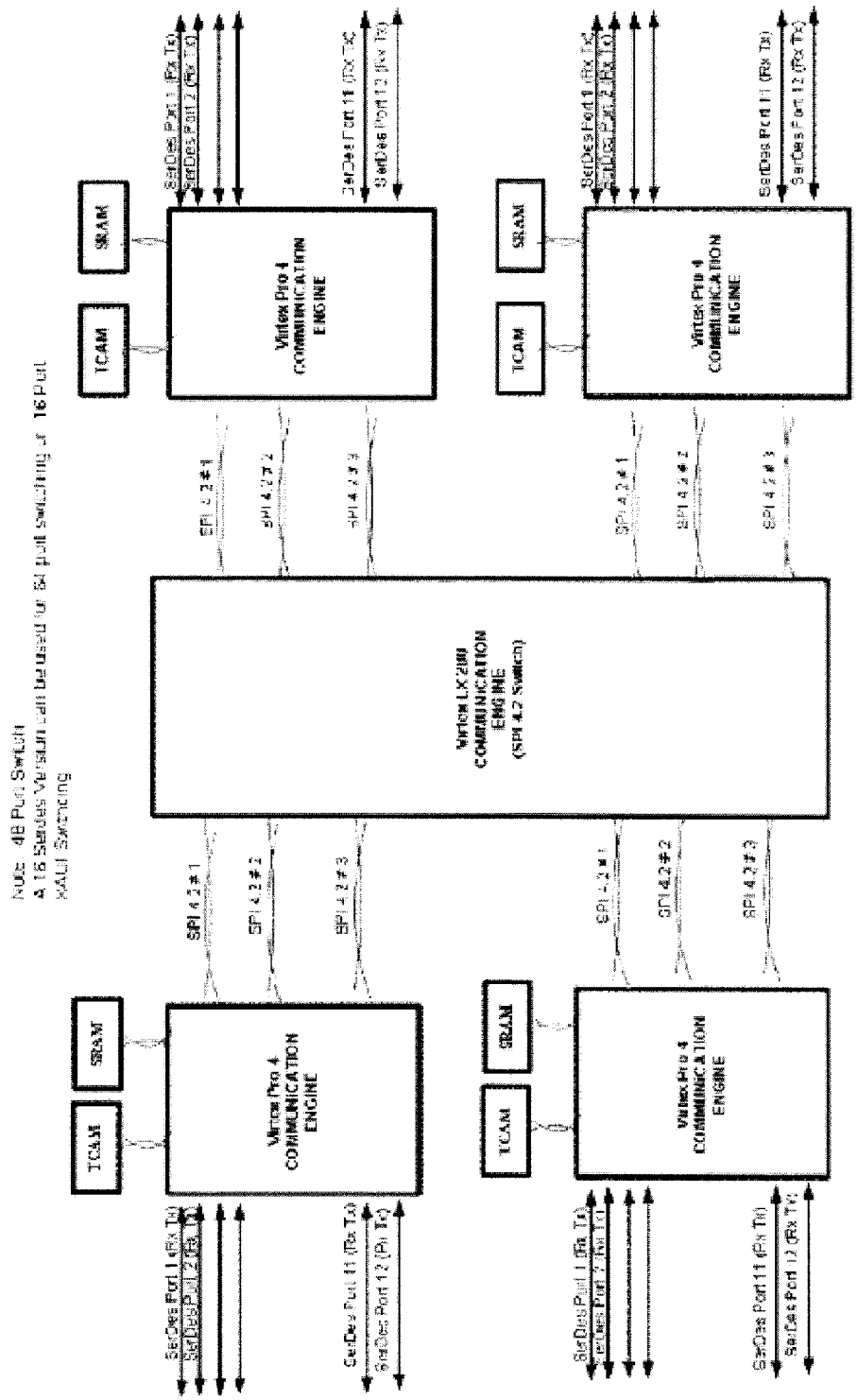
FIG. 32 is an embodiment of an exemplary switch using third-party FPGA's to implement a switching fabric.

FIG. 32 illustrates an embodiment where an adaptable hardware device, i.e Virtex LX 200 communication engine, is configured into a 48 port switch by coupling it to Virtex Pro 4 communication engines which constitute the ingress and egress "ports." The problem with this configuration is that switch arrangement is limited to handling a single protocol for data packets switched through the switch arrangement that would be supported by the Virtex Pro 4 communication engines.

Figure 33:
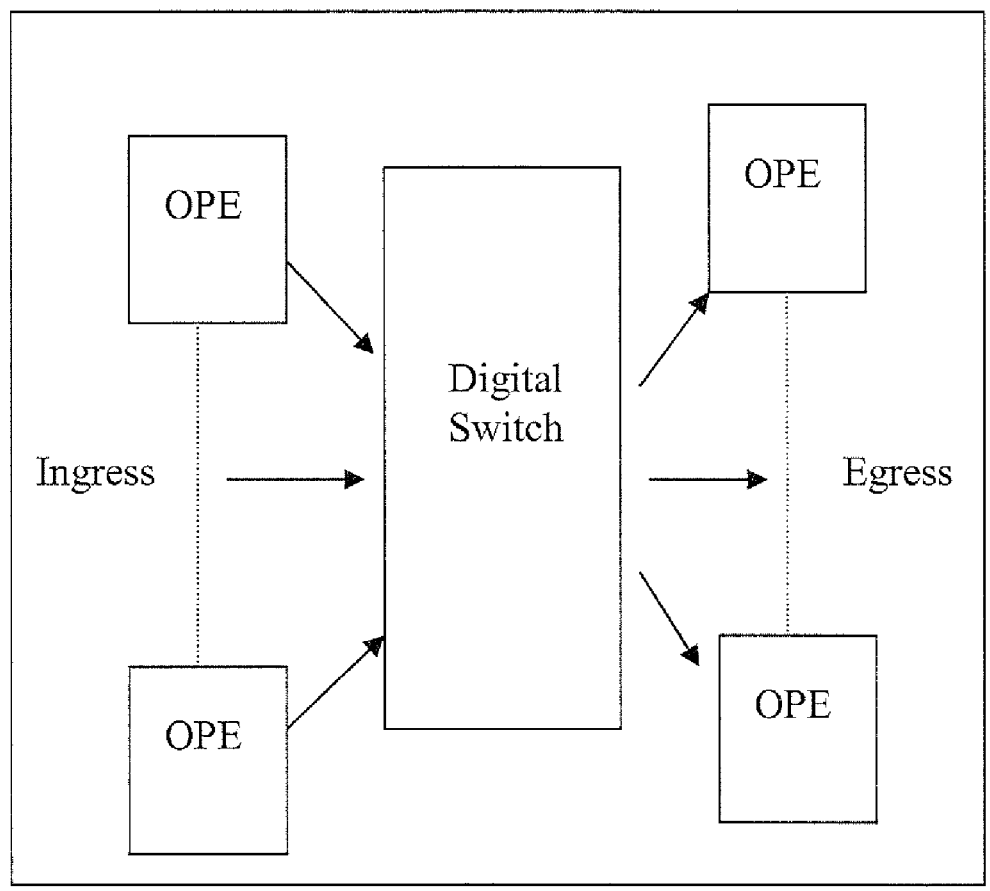
FIG. 33 is a schematic of a switch in accordance with a general embodiment of the instant invention.
Figure 34:
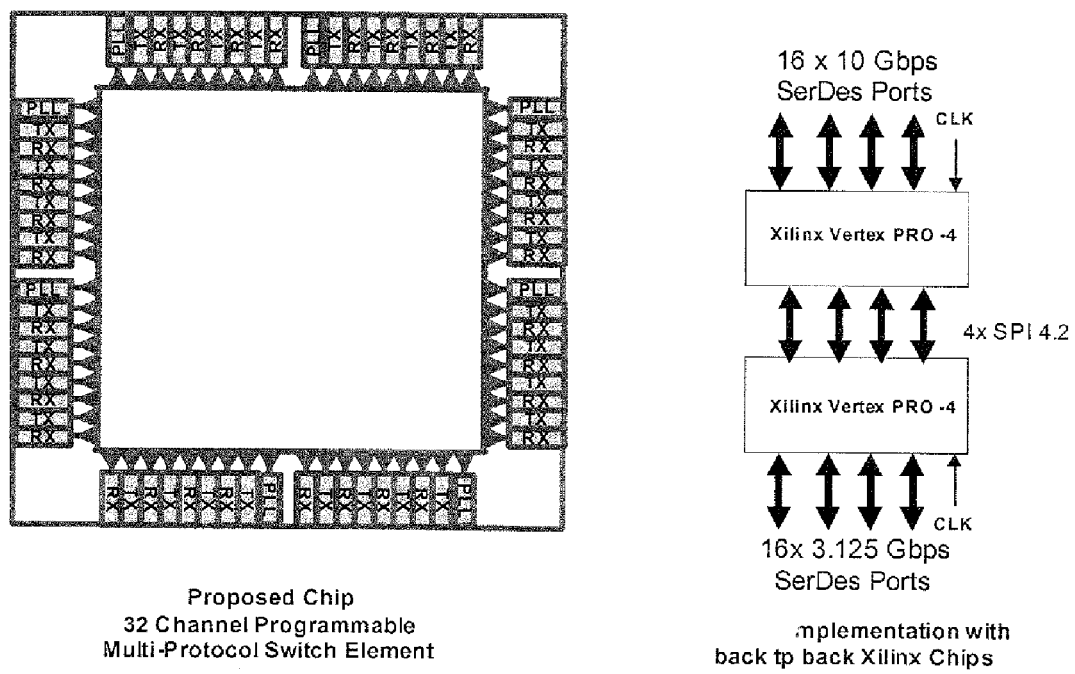
FIGS. 34A and 34B are schematics illustrating an ATMCA mTCA FAT Pipe Switch according to a specific embodiment of the instant invention.
Figure 34B:
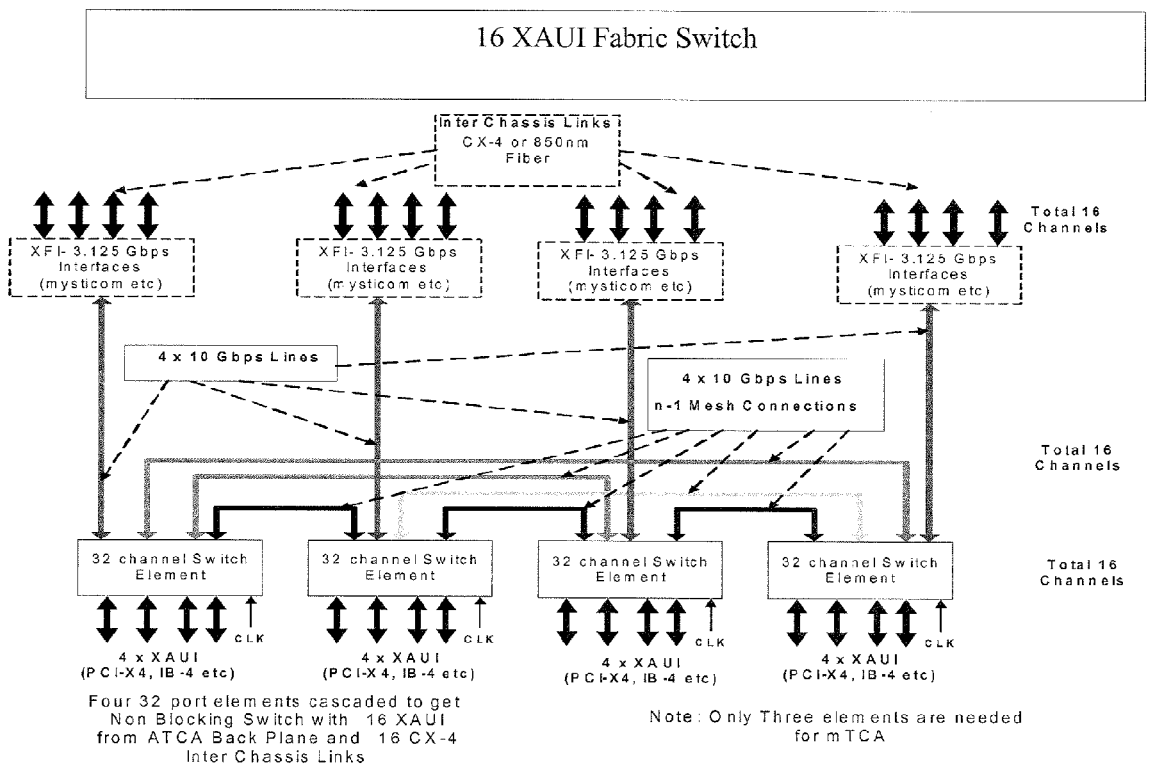

FIG. 33 illustrates a specific architecture of a switch according to the present invention where OPE's form the port processor engines and the digital switch may be either a Virtex LX 200 communication engine or a special purpose OPE forming an intelligent, reprogrammable switching fabric. Unlike the switch arrangement shown in FIG. 32, the embodiment of FIG. 33 utilizing the OPE in accordance with the present invention provides for an omni-protocol switch/bridge arrangement capable of handling data packets of any of a plurality of protocols supported by the OPEs. FIG. 33 schematically illustrates a specific configuration of the switch of the present invention.

In addition to the events generated when entering a state the microprocessor will need to monitor the MAC chip, the SFPs and listen to IPMI events and messages in order to provide the events which cause switch port state transitions. Note that any event may occur at any state and must be caught and handled appropriately. In the interest of clarity the state diagram does not show all potential state transitions. Also, most event transitions cause IPMI event messages to be generated and potentially SNMP traps.

The INIT state is the initial state of the switch port at the instantiation of the port state machine. When this state is entered the first time the SFP is enabled and a TX_ENABLE event generated unless the port has been administratively disable.

When a switch port enters the ENABLED state, a check is performed to determine if the SFP exists. If the SFP exists a MOD_DETECT event is generated.

A switch port entering the FAULTED state is considered down. Human intervention is required to transition out of this state.

MOD_EXISTS—A check is performed on the optical signal when this state is entered. If the signal is normal then a SIGNAL_DETECT event is generated.

Word synchronization is verified at the SIGNAL state. If the signal has synchronized a SIGNAL_SYNC event is generated.

SYNCed. After the signal has synchronized a check is performed to determine if Ethernet auto-negotiation has completed. If Ethernet auto-negotiation has completed an AUTO_NEG_DONE event is generated.

In the UP state, the switch port is UP and is capable of forwarding frames to the switch fabric. However, the MAC address of the connected node has not been learned.

In the READY state the switch port is operational.

In another embodiment of the present invention, lossless packet switching is implemented along the same lines as the discussion of flow routing discussed in *The Next Generation of IP—Flow Routing*, by Dr. Lawrence G. Roberts, Founder, CTO Caspian Networks at SSGRR 2003S International Conference, L'Aquila Italy, Jul. 29, 2003, but using the omni-protocol engine configurations as have been described. The contents of the document are incorporated herein by reference. Additionally, the concepts described in the paper can be extended to implement an end-to-end flow control in the OPE of the present invention to accord with the recommendations of the IEEE 802.3 AR task force on flow control and congestion management.

Applied to the stages comprising one embodiment of the OPE disclosed herein, the Pause per QOS level can be implemented with an Engine (consisting of three Stage Processors: (a) A Bit Stream Processor attached to each of the two required XAUI interfaces; (b) A Look Up Key Generation for Flow identification or Rule based Traffic Priority Identification Flow Classification Stage; (c) A processor stage for generating an appropriate back pressure notification to higher layer Protocol Stack or buffer manger, to meet prospective recommendations of the IEEE 802.3 AR task Force on Flow Control and Congestion Management. The need for priority identification is underscored in P802.3ar *"Congestion Management Why Priority/Class Based PAUSE is Required?"*, Asif Hazarika (ahazirik@fma.fujitsu.com) and Bob Brunner (Robert. Brunner@ericsson.com), the contents of which is incorporated herein by reference.

The Block then, has two XAUI interfaces and one or two SPI 4.2 interfaces implemented with stage processors. With the addition of Traffic Director or the Switching Stage, the Block could also be used for Identification of the incoming Traffic and Direct to Crypto engine or processing engine based on the VLAN tag or any other in band identification. This could be implemented with an 8 SerDes Port Xilinx (FX-40). Alternately, an AMC could be used. This card also meets the third requirement (selecting the XAUI for I/O either from RTM or the Front panel).

It will be understood that in terms of flow processing by the OPE of the present invention, a circuit is called programmable if the functionality can be changed every clock cycle. This is what is normally referred to as a processor. The processor is defined by the instruction set architecture (ISA) and the register file (RF). This is what is called the programmer's view of a processor and that is the interface between the hardware that constitutes the processor and the software that can be executed on the processor. See, Thomas Henriksson, *"Intra-Packet Data-Flow Protocol Processor,"* Linköping Studies in Science and Technology, Dissertation No. 813; and John L. Henessy and David A. Patterson, "Computer Architecture: A Quantitative Approach", Morgan Kaufinan Publishers, Inc., ISBN 1-55860-329-8, Second Edition 1996, the contents of which are incorporated herein by reference. In the context of the present invention, Every Cycle becomes—a Data arrival interval—wherein the data must be processed. Analogizing to an ISA, the stages of the OPE can be defined as Flow PSA—Flow processing Set architecture- and the RF as the Pipe Line Register Files. An ISA, is a set of Micro Code, which performs Fetch (Instruction and or Data), Decode, Defer (to get more Data), Execute (the instruction on the Data), Store Sequence (Von Newman Model). The functionality of the Flow PSA can be similarly denoted.

An embodiment of the IPMI extension that are used to connect all IPM controllers to the chassis in one embodiment of the present invention will be described. For a more detailed description of this aspect of the embodiment of the present invention, reference is made to the previously identified provisional patent application entitled "Shelf Management Controller with Hardware/Software Implemented Dual Redundant Configuration."

Figure 36A:
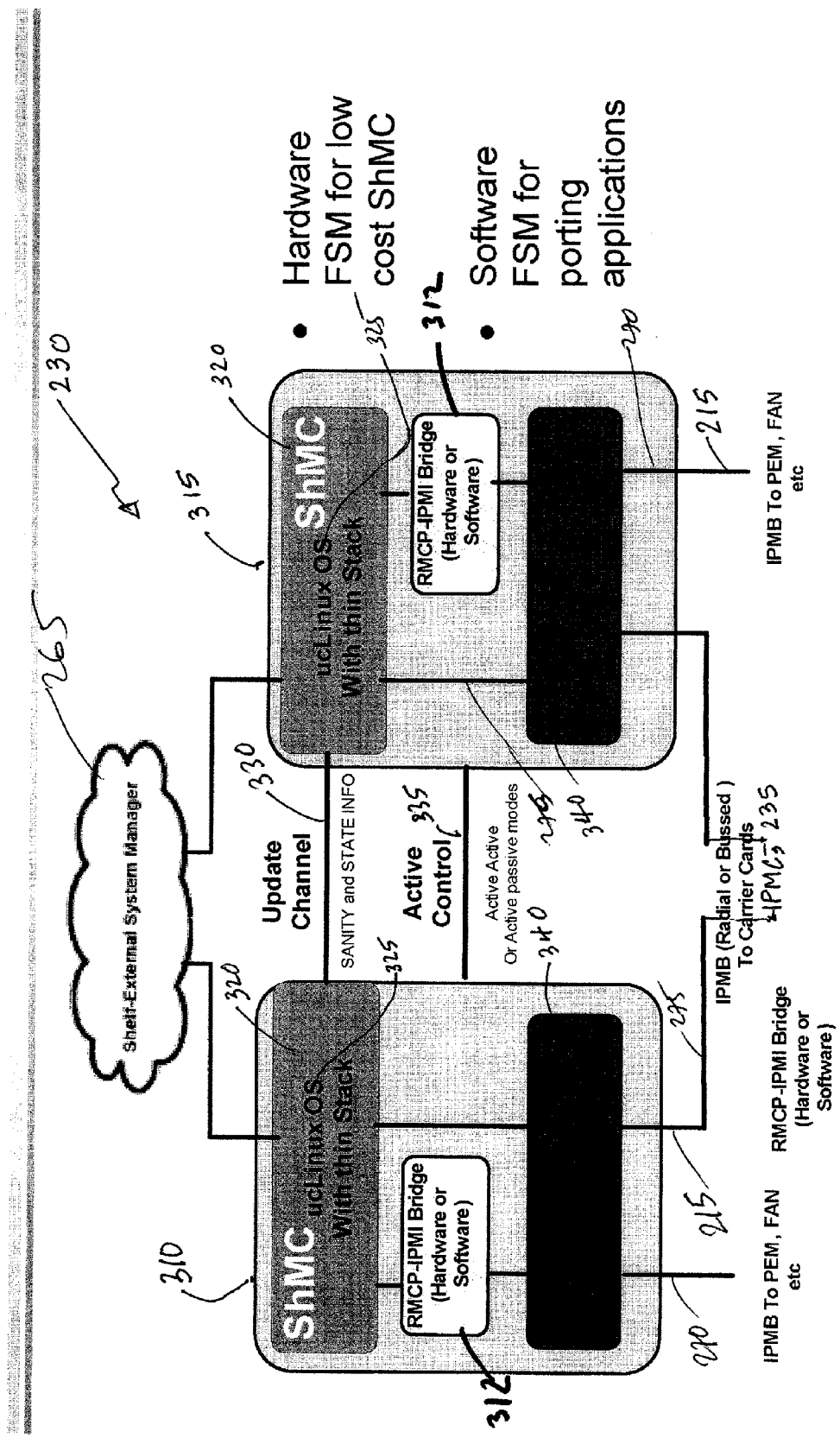
FIGS. 36A and 36B show a block diagram illustrating the shelf management controller (ShMC) according to a primary embodiment of the present invention.
Figure 36B:
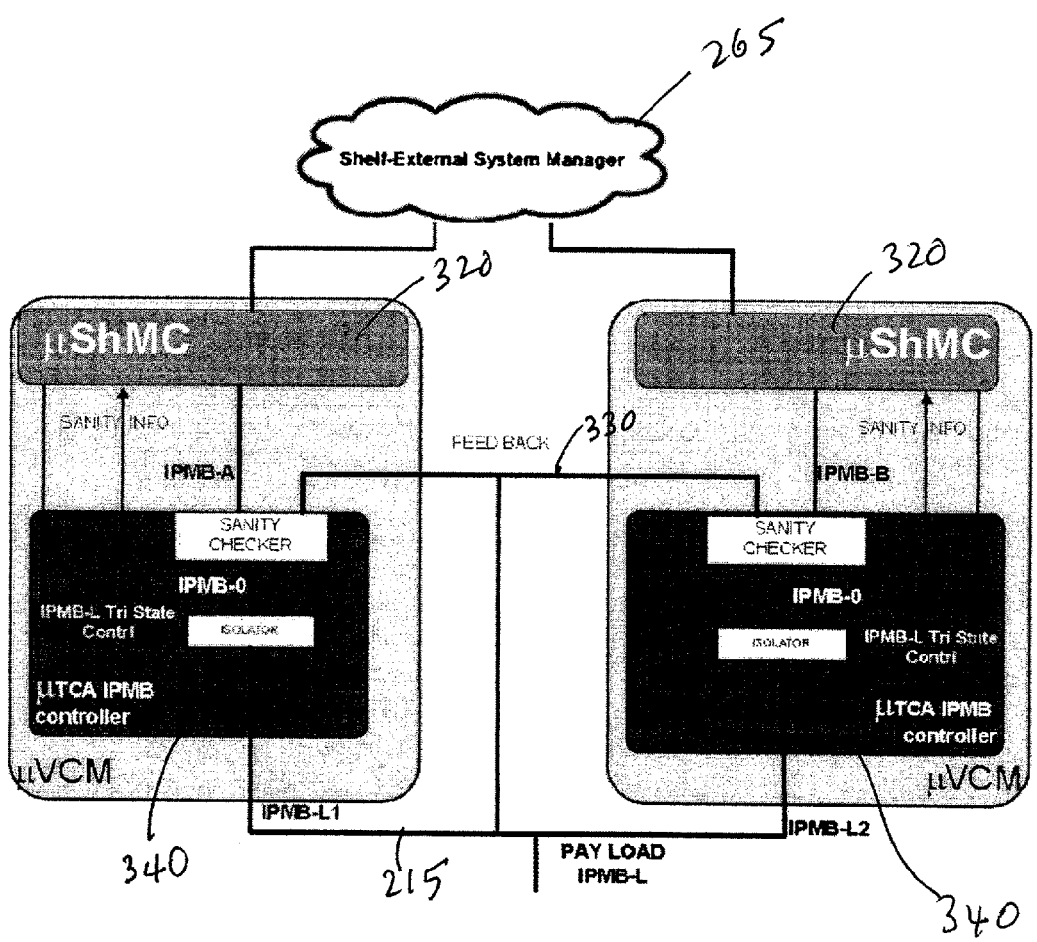

FIGS. 36A and 36B depict a block diagram illustrating a shelf management controller or ShMC 230 according to one embodiment of the present invention. As depicted in the block diagram of FIGS. 36A and 36B, the present invention provides a first ShMC 310 communicatively coupled with a second ShMC 315 in a symmetrical arrangement to provide a redundant shelf management functionality utilizing active/standby architecture with automatic fail-over. In a first embodiment, each of ShMCs 310 and 315 are architecturally identical. Each ShMC 310(315) includes an independent processor 320 running a small footprint operating system (OS) 325 such as for example, the ucLinux OS with a thin stack. The ShMC 310(315) operates on standby power and obtains system health variables by autonomously polling the Intelligent Platform Management Controllers (IPMC)s 235. The ShMC 310(315) is configured to detect an anomaly, log the event, generate and transmit alerts to notify the system of the anomaly and initiate recovery actions.

As depicted to FIG. 36A, each ShMC 310(315) is connected to at least two I2C/IPMB busses IPMB-A 270 and IPMB-B 275. ShMC 310(315) may be arranged in an active-active or active-passive I2C/IPMB failover modes. This embodiment of the present invention contemplates a unified message system which passes messages on an Abstracted Channel (AbCh). In this embodiment of the present invention, a channel is a physical link such as for example, I2C, JTAG, Update Channel and Free Space. In the AbCh view, each channel has attributes such as for example, client server channel, peer channel, master slave channel which indicates the direction of queries and responses, capacity in terms of bandwidth, latency, and CoS or QoS, primary path, alternate path, feed back channel, such as for example, echoing or positive acknowledge messaging. The attributes are assumed to be programmable or hardware assisted with buffers, for instance. All attribute states can be probed at will and so can support registers for example. The AbCh allows the messaging system to route the messages at will or as the needs of a system change. Preferably, a GUI programming tool can be used to create one or more channels for a given hardware platform, to pass attributes to the hardware platform and to measure performance, run simulations, and so forth. One of skill in the art will readily recognize that the capability to execute instructions on an EEPROM enables the applications to be scaled.

Referring again to FIG. 36A, the IPMI messaging system model according to the present invention is depicted as a dual client-server messaging system. The client-server messaging scheme among multiple shelf components uses a channel abstraction layer to maintain layer independence. The ShMC 310 is communicatively coupled to ShMC 315 by a dedicated update channel 330 and an active control channel 335. The update channel 330 is adapted to bi-directionally transmit sanity and state information between the ShMCs 310(315). Two instances of the client-server based messaging system run on each ShMC 10(315). In an exemplary embodiment, the active ShMC 310 (for instance) may be designated the server on system start-up, for example, without departing from the scope of the invention. The ShMC 315 will then be designated the client. The active ShMC 310 executes the command sets to perform shelf-management functions upon receiving state information from the IPMCs 235.

In the illustration embodiment of FIGS. 36A and 36B, the independent processor 320 of the ShMC 310(315) is disposed in communication with a Bit Stream Processor (BSP) 340 disposed with at least one processor interface that is generic for all physical interface types including without limitation IPMI 1.5 over IPMB, Command Line Interface (CLI) over Serial Port, Telnet, and SSH Secure Shell. In one embodiment, the ShMC 310(315) includes a RCMP-IPMI bridge 312, implemented using the BSP 340, for example, that bridges over RMCP and IPMI messages. When a RMCP message packet is received from the system manager, the packet is opened and examined for UDP Port #. If the UDP Port # matches the IPMI message the packet is stripped of its header and an IPMI header (if any) is encapsulates. Then the message is sent to the appropriate interface. The ShMC kernel can request a Copy Back. An IPMI message to the System Manager is encapsulated and sent over the System Manager Physical Port.

Figure 37B:
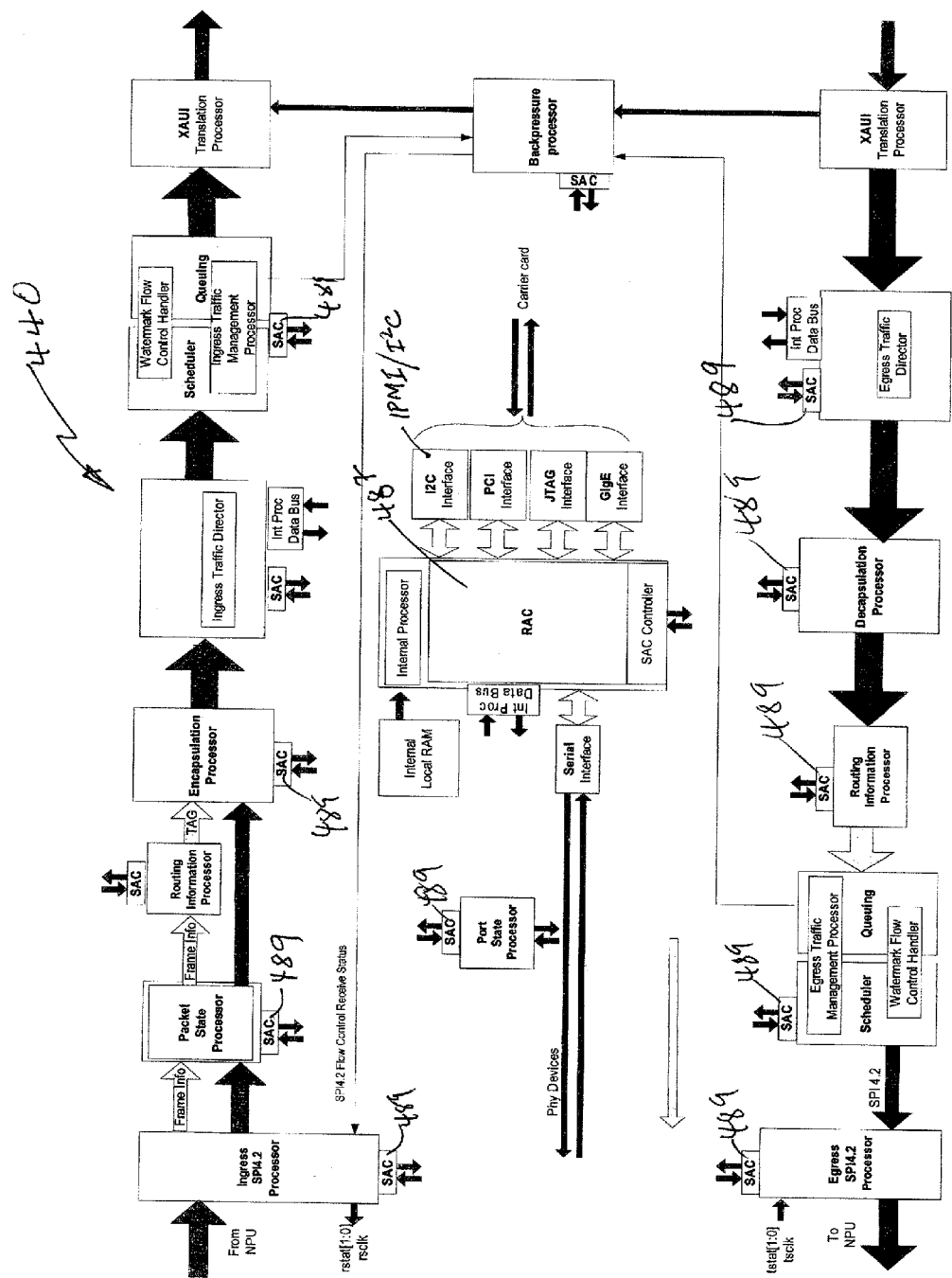
FIG. 37B is a block diagram illustrating an exemplary implementation of bridging between devices using various interfaces.

FIGS. 37A and 37B illustrate an exemplary implementation of the I2C hardware finite state machine (HFSM) 475 using the BSP 440. In this embodiment, the BSP is the Omni-protocol Bit Stream Processor as described in accordance with the present invention. The BSP is configured for wire speed packet data path processing of the bit-stream on the IPMB-A 270 and IPMB-B 275 buses. The BSP is adapted to assemble the bits in the bit-stream into defined protocol data (information) units and process the assembled protocol data (information) units to provide wire-speed throughput regardless of the protocol encountered. Both of these functions are dynamically programmable using, for example, the RAC/SAC (487/489) as discussed below. Thus, either the information units of a protocol or the processing rules that apply to the protocol data (information) units are inherently changeable in a dynamic manner.

In one embodiment, the HFSM 475 includes the BSP 440 configured with a selected sequence of pipelined stage engines. Each stage engine may have a different, extensible and reprogrammable architecture that causes an instantiation of a device finite state machine (DFSM) 480 for each IPMC 235 transmitting a message (e.g. system health, temperature, fan revolution etc) to the HFSM 475. The DFSMs 480 are advantageously configured for data flow communication to a stage engine of the BSP 440 adapted to instantiate a messaging finite state machine (MFSM) 485. Generally, the HFSM (as well as the DFSMs and the MFSM) uses three basic constructs. The HFSM maintains an action table that contains the action to perform when a given event is received while the FSM is in a given state, a next state table which contains the next state to enter when a given event is received while the FSM is in a given state and an event handler which drives the event processing when presented with an event, looks up and performs the necessary actions and updates the current state information. The stage machine (or the BSP or the FPGA) control and status register files are accessible through a Register Access Control (RAC) 487 mechanism whereby IPMI encapsulated messages are directed to the microprocessor in the stage machine (or BSP or FPGA) who then performs the actual register read or write. The microprocessor acts as a Register Access Controller (RAC) who interprets the RAC message, determines which forwarding logic element/Sub-module Access Controller (SAC) 489 the message is addressed and facilitates the register access with the SAC. Resulting status/response is return to the message originator. The RAC/SAC 487/489 provides a means to set or change the messaging methods per device (i.e. IPMC 235) on-the-fly, thus providing one mechanism that implements the level of programmability and flexibility of the present invention.

In one embodiment, the HFSM 475 is adapted to detect I2C bus failure as well as a device failure. If the failure is determined to be on a device monitored by one of the IPMCs 235, the ShMC 310(315) disables that device from accessing the backplane.

Referring again to FIG. 36A, the client 315 monitors the queries and responses of the active ShMC 310 using the update channel 330 and computes the states of the transactions and synchronizes these states with the active ShMC 310. In case the client ShMC 315 detects an error condition in the ShMC 310, it reports the event to the system manager 265 which acts as the referee and acts to remove the active ShMC 310 and enable the standby ShMC 315 to complete the failover without a time consuming state update. While the present embodiment is well suited for operation with AdvancedTCA compliant systems, it will also work in a MicroTCA environment where a tri-stated standby is prescribed as illustrated in FIG. 36B.

In another embodiment, the ShMC 310(315) is augmented by a thin hardware assisted protocol stack. Another embodiment of the system implements an OS bypass scheme to assure a tiny and manageable ShMC implementation. The primary embodiment includes a EEPROM to execute instructions, such as for example an EEPROM with a TINY CHIP using system-on-chip (SOC) concepts, that would enable cost wise scaling of the capabilities of the ShMC processor 320.

In one embodiment, the dual redundant ShMC 310(315) configuration is used to introduce fault tolerant operation of the shelf management controller. In a first embodiment, checkpoints are inserted by adding an additional checkpoint state in the HFSM 475. When a current state in the HFSM 475 is the checkpoint state, a checkpoint process may be initiated. On errors being indicated, the HFSM 475 may initiate a failover to ShMC 315 over the exclusive-use bus 335 and a recovery process initiated on ShMC 310 without introducing an abnormality in the ATCA shelf. The recovery process may be done by restoring faulty states internal to the ShMC 310 by replaying the logged states stored on ShMC 315 in their original order to recreate ShMC 310's pre-failure state. In another embodiment, an additional ShMC 492 may be used to augment ShMC 310(315) and the correct state is obtained by voting among the three or more copies of the states held between the three ore more ShMCs. In one embodiment, the voted results are loaded into the registers of each of the HFSMs 475 for purposes of resolving any conflicting votes.

Figure 38:
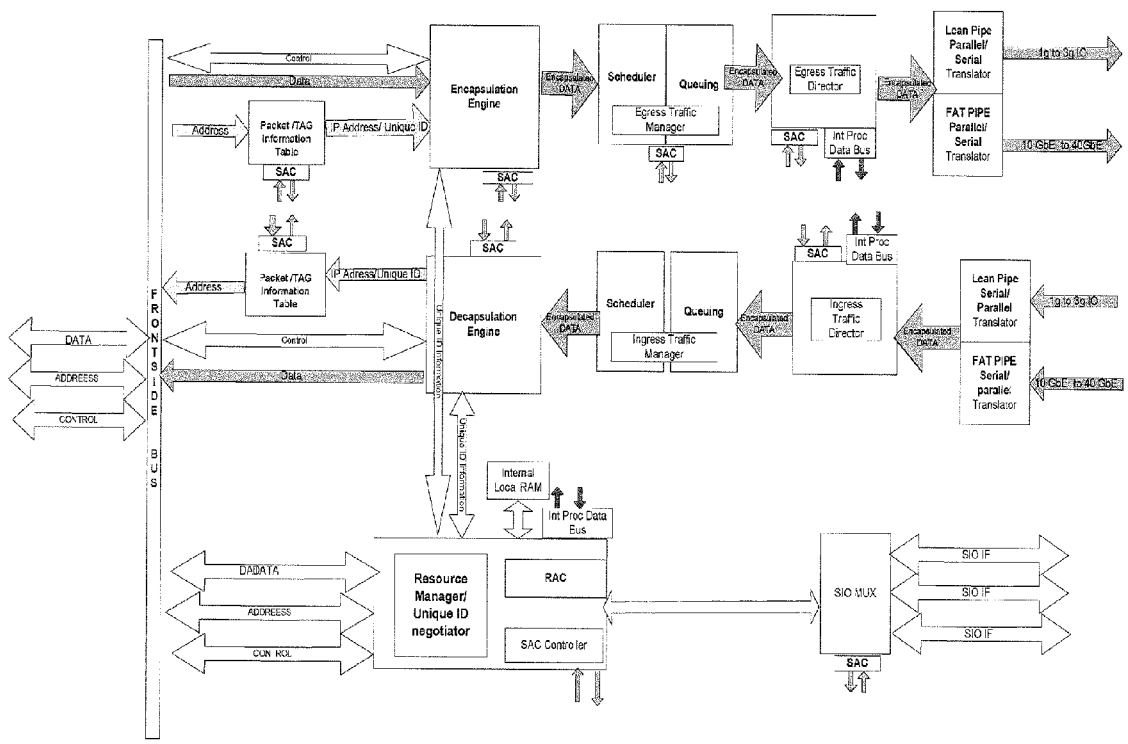
FIG. 38 illustrates a block diagram of one embodiment of a bit stream protocol processor in accordance with one embodiment of the present invention.

In one embodiment of the present invention illustrated in FIG. 38, a bit steam protocol processor (alternatively referred to as the bit stream protocol processor based bridge or simply as the bit stream protocol processor) providing a SPI 4.2 to XUAI two-way bridge architecture is shown. The first type of serial data transmission interface corresponds to a SPI 4.2 interface and the second type of serial data transmission interface is the XAUI interface.

The bit stream protocol processor of this embodiment provides dual SPI 4.2 to XAUI bridges. SPI 4.2 provides a parallel, point-to-point, bidirectional interface. The SPI 4.2 Framing supports up to a maximum of 256 ports. Data is sent through the SPI-4.2 frame using the 16 LVDS data lanes, as one complete packet or as multiple data bursts per port. A control word header appended to the sub-channel data delineates the bursts. The start of packet bit (S) and the end of packet status bits (EOPS) in the control word are used to identify a complete packet that may be made up of multiple bursts. The address [0:7] are used to define a sub-channel. The flow control and status information is transported out of band, per sub channel. The interface bandwidth can range from 10 Gbit/s for low overhead applications to 20 Gbit/s for applications such as switch fabrics that need bandwidth speedup in order to support overhead information.

It will be seen that for 10 GigE each bit stream protocol processor may support 10 Gbps full duplex per port, making it possible to attain a 2.560 Tbps switching throughput capacity. For 40 GigE, each bit stream protocol processor may support 40 Gbs full duplex per port, making is possible to attain a 10 Tbps switching throughput capacity. In general, it will be recognized that the reconfigurable and programmable nature of the omni-protocol engine in accordance with the present invention permits the processors to be inherently scalable over a range of clock speeds.

It will be recognized that the bit stream protocol processor in accordance with one embodiment of the present invention can provide N interconnects between, for example, the system processor (CPU) of the PC and the system memory. Each of the N interconnects may be configured to transfer data at 10 Gbps resulting in a scaled throughput of 10N Gbps. The SPI 4.2 is point to point interface between devices located with in a few inches of each other. In a system it is often desirable to interconnect SPI 4.2 devices which are located on different cards with in a chassis via a back plane (Intra Chassis) or located on different chassis (Inter Chassis). Under such circumstances it is advantageous to use the serial point-to-point links of the present invention that provide high bandwidth connections in Intra-Chassis or Inter-Chassis environments. Exemplary serial links include ASI using PCI-Express, Ethernet using XAUI, and Infiniband using IB. This in effect translates to connecting any two out of possible hundreds of geographically separated SPI 4.2 devices with a "Virtual Wire" interface. In one embodiment, the present invention may be configured as a single board computer (PC). In another embodiment, the present invention provides for a industry standards (such as picoTCA for example) enclosure with removably attached blades that support field pay as you go end-user upgrades.

To transport control word, including port address, data and the out of band flow control information available on the parallel SPI 4.2 interfaces using serial links, or via a virtual wire, a tunneling protocol is utilized. To assure high bandwidth utility these tunneling protocols are preferably light weight. The tunneling features may be embedded in to the SPI 4.2 devices or a bridge chip could be used in conjunction with the SPI 4.2 devices to provide this conversion. To support this bridging between SPI 4.2 devices using various serial interfaces using maturing tunneling protocols, the bridge is programmable. In this embodiment, the bit stream protocol processor based bridge which provides the SPI 4.2 interfaces to XAUI and other serial interfaces and flexible means for various tunneling protocols. The bit stream protocol processor offers dynamic programming and function extensibility as described in Appendix A that is incorporated herein in its entirety.

Figure 39:
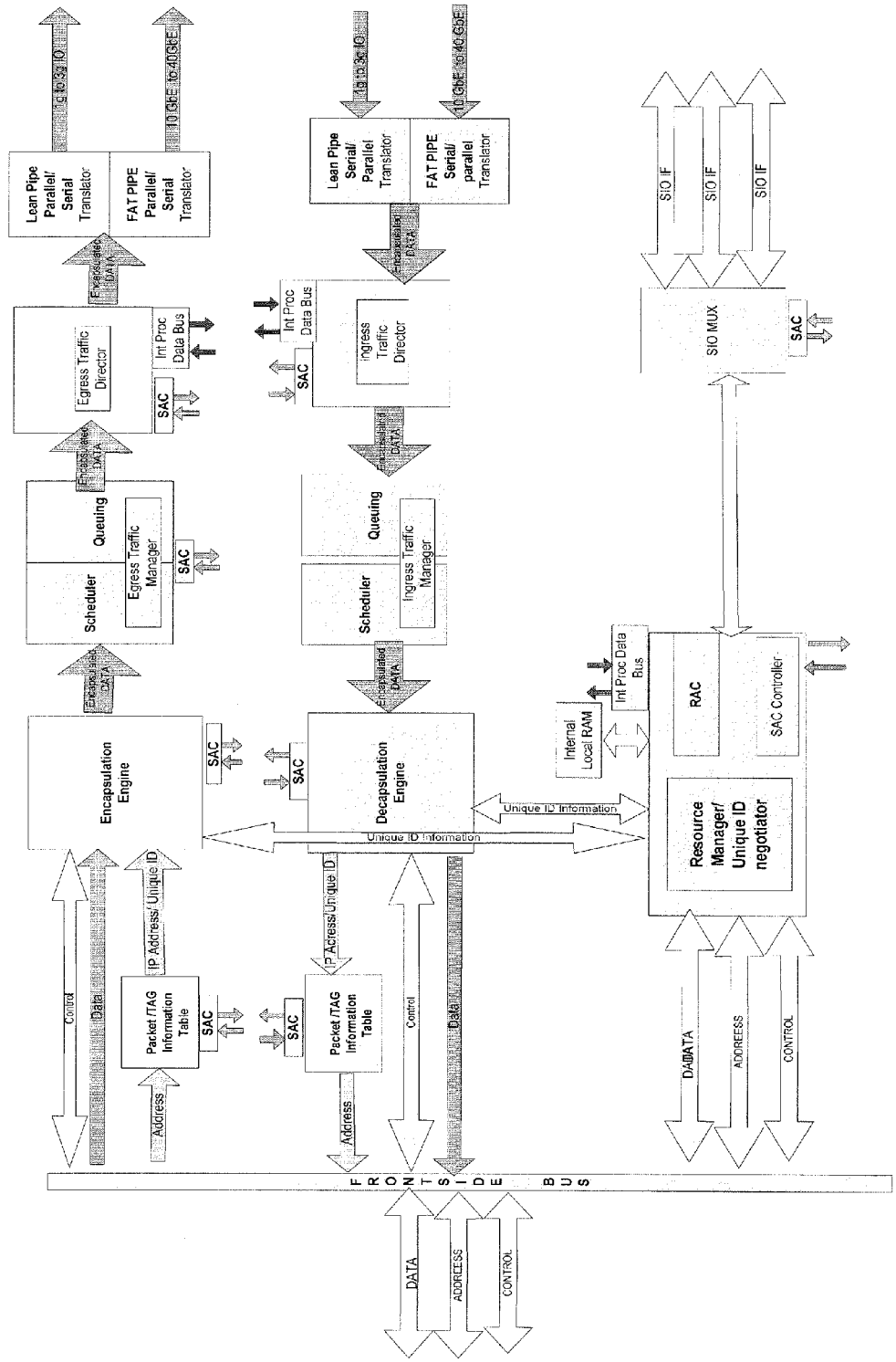
FIG. 39 illustrates a block diagram of another embodiment of a bit stream protocol processor in accordance with one embodiment of the present invention.

Referring now to FIG. 39, another embodiment of a bit stream protocol processor is shown. In this embodiment, the bit stream protocol processor directly interfaces with the front side bus (FSB), thereby eliminating certain of the translation processes in the bit stream protocol processor described in connection with FIG. 38. In addition, the bit stream protocol processor of FIG. 39 provides for both lean pipe and fat pipe parallel-serial translators, thus permitting selective aggregation of one or more Ethernet ports for the fat pipe configurations.

In one embodiment, the bit stream protocol processor allows line speed QoS packet switching which is utilized to implement a simple token based communication in Ethernet. The source address (SA) and destination address (DA) and E-type like VLAN Tag is used for negotiating a unique token between end points on a communication link. The E-type extensions may be, for example, Request for UNIQUE ID or TOKEN GRANT; data communication with the granted token and request to retire the TOKEN. Once the TOKEN has been granted, the SA and DA fields are used along with the E-type to pass short date. This may also be extended to include large blocks of data for STA, and SAS. In other embodiments, once a UNIQUE ID is negotiated between end-points and an intermediate node connecting these endpoints, a fixed frame size is used to endow the link with predictable performance in transferring the fixed frame and consequently meet various latency requirements. For example, the SA/DA pair could be used to transmit 12 bytes of data, 2 E-Type bytes and 2 bytes TAG, instead of the traditional 64 byte payload for a conventional Ethernet packet. For a more detailed description of one embodiment of this extended Ethernet communication technique, reference is made to the previously identified provisional patent application entitled "Enhanced Ethernet Protocol for Shortened Data Frames Within a Constrained Neighborhood based on Unique ID".

In another embodiment, the same interface could provide a fixed 2K block size frame for Disc—(data follows the E-Type and TAG). In this respect, the present invention enables a programmable frame size Ethernet construct as opposed to the variable frame size construct known to the art. This capability can be especially useful in iTDM type of applications because it enables packetizing TDM traffic within the framework of ATCA.

In one embodiment, Ethernet VLAN header is used as a tunneling protocol to allow the industry standard Ethernet Switches to be used to switch between any two SPI 4.2 devices located in an Intra Chassis or Inter Chassis environment. The primary embodiment of the present invention uses Gigabit Ethernet (GbE) as the second data transmission protocol. Other protocols may be used without departing from the scope of the present invention. The SPI 4.2 control word and flow-control information is converted to a standard Ethernet VLAN header. The SPI 4.2 sub-channel data is encapsulated with the header information at the ingress. At the egress, the header information is stripped from the Ethernet frame and converted back to SPI 4.2 frame and the flow control information is translated to SPI 4.2 electrical signals. Additionally, the bit stream protocol processor provides an efficient means to embed the Class of service information and programmable means for generating and propagating Congestion Management messages.

In one embodiment, the bit stream protocol processor is configured to support interfaces such as GbE, PCI-Express, RGMII, PCI bus and Serial bus to make it an ideal universal device for use in ATCA and microTCA systems. One skilled in the art will recognize that other interconnect technologies such as for example, the XS4 10 Gigabit Ethernet and HiGig SPI4.2 Bridge from MorethanIP, to bridge an SPI4.2 interface to a XAUI interface to meet multiple design requirements such as device Bridging (e.g. NPU to Ethernet Switch), Serial Backplane applications, Packet over SONET/SDH or Ethernet over SONET/SDH applications.

The ability provided by the present invention, to interconnect SPI 4.2 devices which are located on different cards within a chassis via a back plane (Intra Chassis) or located on different chassis (Inter Chassis) enables one embodiment of the present invention to achieve standards based PC such as for example, the picoTCA or the microTCA standard based PC architecture.

One embodiment of the bit stream protocol processor illustrated in FIGS. 38 and 39 advantageously utilizes the RAC/SAC controller that endows the bit stream protocol processor with dynamic programming and function extensibility. The RAC/SAC controller structure is used to program the bit stream protocol processor on-the-fly. This capability may be used to configure the blade (board) on which the bit stream protocol processor resides. In one embodiment, the on-the-fly dynamic programming capability is used to turn the blade (board) on or off thereby including or removing the blade from the computer system. In another embodiment the on-the-fly dynamic programming capability may be used to change the character of the bridge so that it bridges between SPI 4.2 and PCI-Express for example. Those skilled in the art will recognize that other configuration changes may be affected within the scope of the present invention using the RAC/SAC controller. For example, the programmability may be used to implement a real end-to-end QoS for various traffic flows through the computer system.

In another embodiment, the bit stream protocol processor enables prioritized switching. In conjunction with the modular and scalable picoTCA PC architecture of the previous paragraph, the present invention allows the creation of a N-layered hierarchy of multiprocessors where N is both hardware independent and dynamically selectable by altering the prioritization afforded to different subsets of processors in the bit stream protocol processor mediated fabric. This embodiment enables the PC to be configured as a shared memory model machine as well as a message passing model multiprocessor machine. Alternately, the PC in accordance with one embodiment of the present invention may be configured as a server, a storage area network controller, a high performance network node in a grid computing based model, or a switch/router in a telecommunication network. It will be recognized that the same basic machine may be programmatically or manually altered into one or more of the aforementioned special purpose machines as and when desired.

Various modifications to the method may be apparent to one of skill in the art upon reading this disclosure. The above is not contemplated to limit the scope of the present invention, which is limited only by the claims below

The invention claimed is:

1. An omni-protocol data packet processing engine for managing communication of data packets between a computer processor and a high speed network fabric having a line speed of at least 10 Gb/second, the omni-protocol data packet processing engine comprising:

an ingress portion of the data packet processing engine, including:
a first plurality of bit-stream stage processors, each bit-stream stage processor having a programmable control memory unique to that bit-stream stage processor;
an ingress processor-interface to the computer processor;
an ingress network-interface to the network fabric; and
a first multi-port data flow packet memory operably coupled to the first plurality of bit-stream stage processors, the ingress processor-interface, and the ingress network-interface; and an egress portion of the data packet processing engine including:
a second plurality of bit-stream stage processors, each second bit-stream stage processor having a programmable control memory unique to that bit-stream stage processor;
an egress processor-interface to the computer processor;
an egress network-interface to the network fabric; and
a second multi-port data flow packet memory operably coupled to the second plurality of bit-stream stage processors, the egress processor-interface, and the egress network-interface;

wherein the control memory of each of the bit-stream stage-processors is individually selectively dynamically programmable based on one of a plurality of protocols determined for a given data flow of one or more data packets and the bit-stream stage-processors process the given data flow as a flow of bit stream data through the multi-port data flow packet memory such that processing of the given data flow by the plurality of bit-stream stage processors is timed according to the flow of bit stream data and the flow of bit stream data is established at a rate that enables continuous operation of the data packet processing engine for all of the plurality of protocols substantially at a speed that is at least equal to the line speed of the high speed network fabric, and wherein each of the bit-stream stage processors is configured to programmed to deliver a bit-stream functionality and interconnect with other bit-stream stage processors, such that the bit-stream functionality of a single stage is deliverable within a dwell time that does not exceed a time interval elapsing between the arrival of two consecutive data packets from the high speed network fabric.

2. The data packet processing engine of claim 1 wherein the continuous operation characterized in that the data packets are transferred through each of the bit-stream stage processors in less than the dwell time.

3. An omni-protocol data packet processing engine for managing communication of data packets between a computer processor and a high speed network fabric having a line speed of at least 10 Gb/second, the omni-protocol data packet processing engine comprising:

an ingress portion of the data packet processing engine, including:
a first plurality of bit-stream stage processors, each bit-stream stage processor having a programmable control memory unique to that bit-stream stage processor;
an ingress processor-interface to the computer processor;
an ingress network-interface to the network fabric; and
a first multi-port data flow packet memory operably coupled to the first plurality of bit-stream stage processors, the ingress processor-interface, and the ingress network-interface; and an egress portion of the data packet processing engine including:
a second plurality of bit-stream stage processors, each second bit-stream stage processor having a programmable control memory unique to that bit-stream stage processor;
an egress processor-interface to the computer processor;
an egress network-interface to the network fabric; and a second multi-port data flow packet memory operably coupled to the second plurality of bit-stream stage processors, the egress processor-interface, and the egress network-interface;

wherein the control memory of each of the bit-stream stage-processors is individually selectively dynamically programmable based on one of a plurality of protocols determined for a given data flow of one or more data packets and the bit-stream stage-processors process the given data flow as a flow of bit stream data through the multi-port data flow packet memory such that processing of the given data flow by the plurality of bit-stream stage processors is timed according to the flow of bit stream data and the flow of bit stream data is established at a rate that enables continuous operation of the data packet processing engine for all of the plurality of protocols substantially at a speed that is at least equal to the line speed of the high speed network fabric, and wherein each bit-stream stage processors further comprise:

a plurality of data flow dependencies between components;

control structures that alter the plurality of data flow dependencies; and a generic interface that implements the control structures to enable the bit-stream stage processors to accept an ingress data flow, and output a processed packet flow and a meta data object associated with the ingress data flow and/or the processed packet flow;

wherein the bit-stream stage processor is a member of a base class that can be grouped into a sub-class providing additional functional methods.

* * * * *

UNITED STATES PATENT AND TRADEMARK OFFICE
CERTIFICATE OF CORRECTION

| | | |
|---|---|---|
| PATENT NO. | : 7,782,873 B2 | Page 1 of 1 |
| APPLICATION NO. | : 11/466367 | |
| DATED | : August 24, 2010 | |
| INVENTOR(S) | : Sharma | |

It is certified that error appears in the above-identified patent and that said Letters Patent is hereby corrected as shown below:

Title Page, Item (60), please delete "60/822,181" and insert in its place --60/822,171--
    Column 1, Line 18, please delete "60/822,181" and insert in its place --60/822,171,--

Signed and Sealed this

Thirty-first Day of January, 2012

David J. Kappos
*Director of the United States Patent and Trademark Office*